United States Patent
Yoshida et al.

(10) Patent No.: US 9,380,199 B2
(45) Date of Patent: Jun. 28, 2016

(54) RECORDING MEDIUM AND CONTROL METHOD THEREOF

(71) Applicant: CANON KABUSHIKI KAISHA, Tokyo (JP)

(72) Inventors: Masashi Yoshida, Miura-gun (JP); Yasuyuki Ogawa, Tokyo (JP); Satoshi Ogiwara, Sagamihara (JP); Takashi Aizawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/353,930

(22) PCT Filed: Nov. 22, 2012

(86) PCT No.: PCT/JP2012/081014
§ 371 (c)(1),
(2) Date: Apr. 24, 2014

(87) PCT Pub. No.: WO2013/081083
PCT Pub. Date: Jun. 6, 2013

(65) Prior Publication Data
US 2014/0307109 A1   Oct. 16, 2014

(30) Foreign Application Priority Data
Dec. 2, 2011   (JP) .................... 2011-265311

(51) Int. Cl.
*H04N 5/76* (2006.01)
*H04N 5/232* (2006.01)
(Continued)

(52) U.S. Cl.
CPC ....... *H04N 5/23206* (2013.01); *H04N 1/00217* (2013.01); *H04N 1/00251* (2013.01);
(Continued)

(58) Field of Classification Search
CPC ... H04N 5/23206; H04N 5/765; H04N 5/772; H04N 1/00217; H04N 1/00265; H04N 1/00278; H04N 1/00281; H04N 1/2112; H04N 1/2183; H04N 1/2166
USPC .................................................... 348/231.99
See application file for complete search history.

(56) References Cited

U.S. PATENT DOCUMENTS 7,535,490 B2   5/2009   Aizawa .................... 348/207.11
8,248,961 B2   8/2012   Fujii ............................. 370/252
(Continued)

FOREIGN PATENT DOCUMENTS

CN   101371516 A   2/2009
EP   1 630 726 A2   3/2006   ............. G06K 19/07
(Continued)

OTHER PUBLICATIONS

EP Application No. 12853368.4, European Search Report dated Jun. 29, 2015.

*Primary Examiner* — Yogesh Aggarwal
(74) *Attorney, Agent, or Firm* — Fitzpatrick, Cella, Harper & Scinto

(57) ABSTRACT

A recording medium removable from a host device includes a wireless communication unit for performing wireless communication with an external device different from the host device. The recording medium includes an image transmission control unit which transmits image data to the external device via the wireless communication established by the wireless communication unit by using an image transmission protocol. The recording medium switches which of the image transmission control unit of the recording medium and an image transmission control unit of the host device is used to communicate with the external device via the wireless communication unit.

27 Claims, 19 Drawing Sheets

(51) Int. Cl.
  *H04N 1/00* (2006.01)
  *H04N 1/21* (2006.01)
  *H04N 5/765* (2006.01)
  *H04N 5/77* (2006.01)
  *H04N 21/418* (2011.01)

(52) U.S. Cl.
  CPC ....... *H04N1/00265* (2013.01); *H04N 1/00278* (2013.01); *H04N 1/00281* (2013.01); *H04N 1/00315* (2013.01); *H04N 1/2112* (2013.01); *H04N 1/2166* (2013.01); *H04N 1/2183* (2013.01); *H04N 5/765* (2013.01); *H04N 5/772* (2013.01); *H04N 21/418* (2013.01)

(56) References Cited

U.S. PATENT DOCUMENTS

| | | | |
|---|---|---|---|
| 8,280,975 B2 | 10/2012 | Hara et al. | 709/216 |
| 8,581,990 B2 * | 11/2013 | Fujitsuka | 348/207.1 |
| 8,665,474 B2 | 3/2014 | Kato | 358/1.15 |
| 8,731,469 B2 | 5/2014 | Tokunaga | 455/41.2 |
| 2002/0080276 A1 * | 6/2002 | Mori et al. | 348/553 |
| 2002/0174337 A1 | 11/2002 | Aihara | 713/172 |
| 2003/0128272 A1 | 7/2003 | Clough et al. | |
| 2006/0017963 A1 | 1/2006 | Sakuda et al. | 358/1.15 |
| 2006/0039221 A1 | 2/2006 | Fukuda | |
| 2006/0285502 A1 | 12/2006 | Bigioi et al. | 370/254 |
| 2007/0058031 A1 | 3/2007 | Aizawa | 348/14.01 |
| 2010/0220605 A1 | 9/2010 | Fujii | 370/252 |
| 2011/0019007 A1 | 1/2011 | Elazar et al. | 348/207.1 |
| 2011/0026068 A1 | 2/2011 | Yoshida | 358/1.14 |
| 2011/0187873 A1 | 8/2011 | Fujitsuka | 348/207.1 |
| 2012/0166577 A1 | 6/2012 | Yoneyama et al. | |

FOREIGN PATENT DOCUMENTS

| | | |
|---|---|---|
| EP | 1989830 A | 11/2008 |
| JP | 2002-091709 A | 3/2002 |
| JP | 2002-329180 A | 11/2002 |
| JP | 2004-357182 A | 12/2004 |
| JP | 2005-222234 A | 8/2005 |
| JP | 2005-223710 A | 8/2005 |
| JP | 2006-186894 A | 7/2006 |
| JP | 2006-224344 A | 8/2006 |
| JP | 2007-081889 A | 3/2007 |
| JP | 2007-251922 A | 9/2007 |
| JP | 2010-117894 A | 5/2010 |
| JP | 2010-182242 A | 8/2010 |
| JP | 2011-160340 A | 8/2011 |
| KR | 10-2008-0103571 A | 11/2008 |
| WO | WO 2007/094512 A1 | 8/2007 |
| WO | 2011/068471 A1 | 6/2011 ............ G06K 19/06 |
| WO | WO 2013/099781 A1 | 7/2013 |

\* cited by examiner

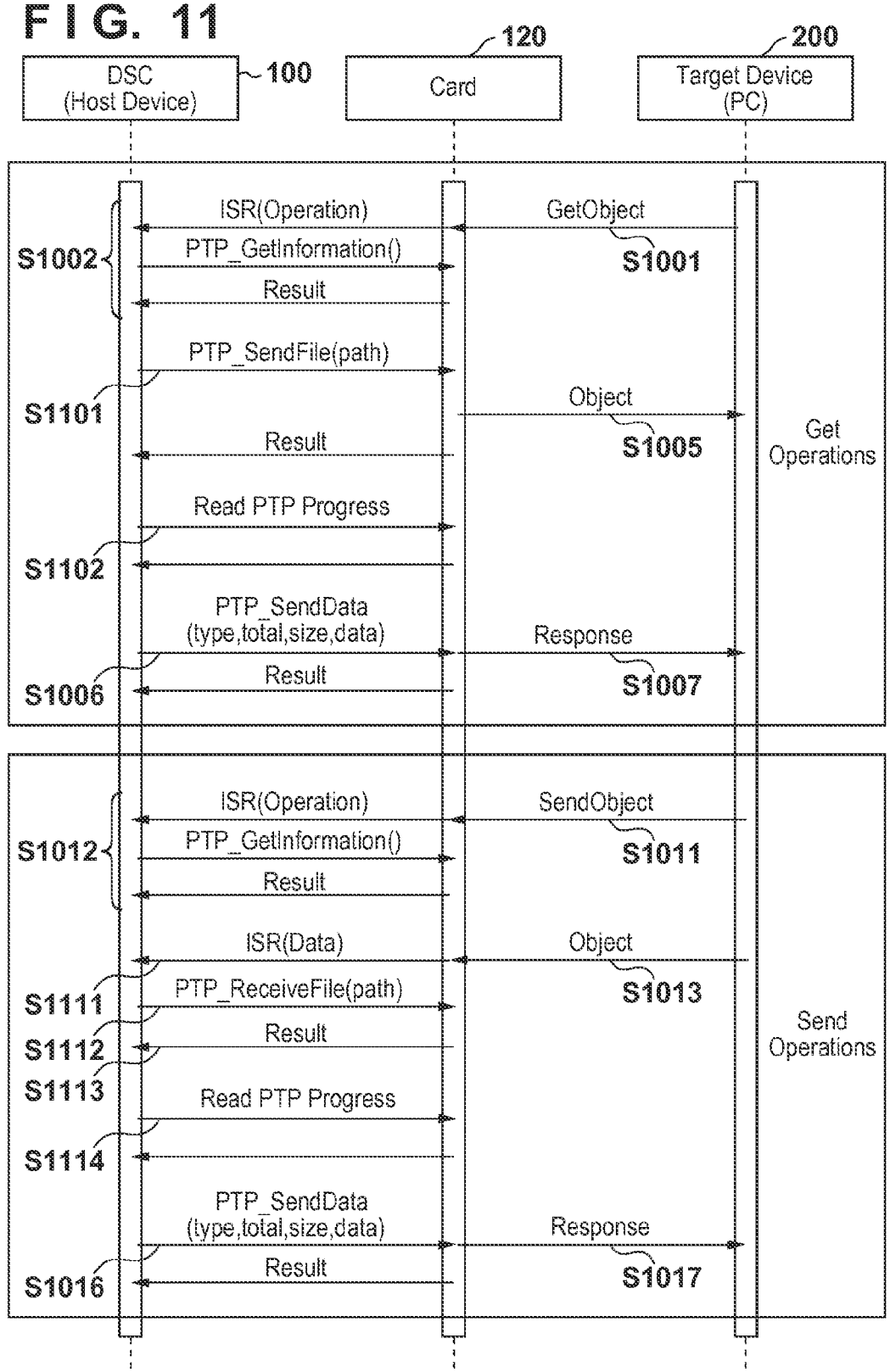

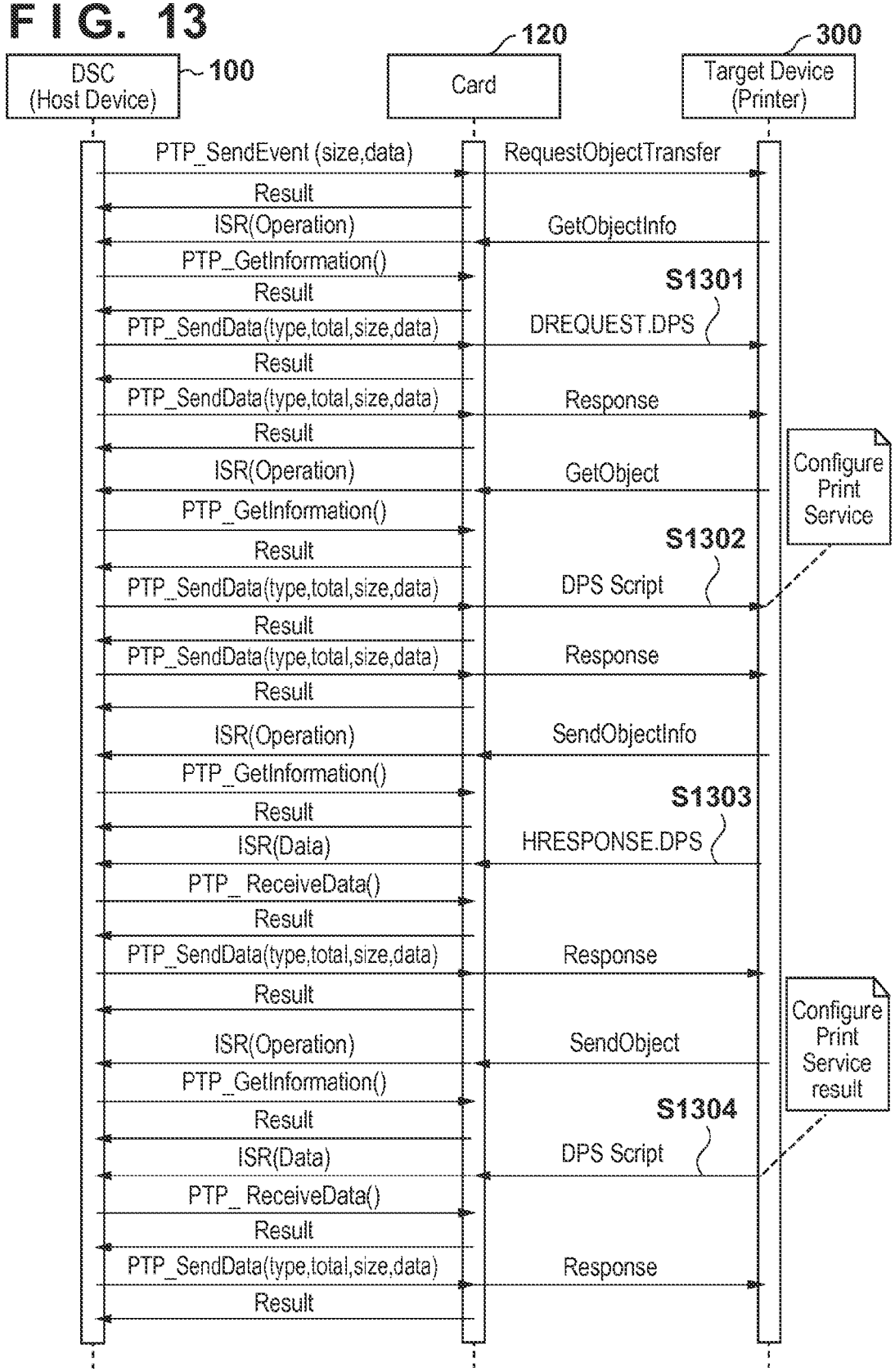

FIG. 14A

```
<ConfigurePrintService>

<?xml version="1.0" ?>
<dps xmlns="http://www.cipa.jp/dps/schema/">
  <input>
    <configurePrintService>
      <dpsVersions>1.0</dpsVersions>
      <vendorName>DSC_Vendor</vendorName>
      <vendorSpecificVersion>1.0</vendorSpecificVersion>
      <productName>DPS_DSC</productName>
      <serialNo>ABC01234567</serialNo>
    </configurePrintService>
  </input>
</dps>

<ConfigurePrintService result>

<?xml version="1.0" ?>
<dps xmlns="http://www.cipa.jp/dps/schema/">
  <output>
    <result>10000000</result>
    <configurePrintService>
      <printServiceAvailable>30010000</printServiceAvailable>
      <dpsVersions>1.0</dpsVersions>
      <vendorName>Printer_Vendor</vendorName>
      <vendorSpecificVersion>1.0</vendorSpecificVersion>
      <productName>DPS_Printer</productName>
      <serialNo>ABC01234567</serialNo>
    </configurePrintService>
  </output>
</dps>
```

FIG. 14B

```
<GetCapability>

<?xml version="1.0" ?>
<dps xmlns="http://www.cipa.jp/dps/schema/">
  <input>
    <getCapability>
      <capability>
        <datePrints />
      </capability>
    </getCapability>
  </input>
</dps>

<GetCapability result>

<?xml version="1.0" ?>
<dps xmlns="http://www.cipa.jp/dps/schema/">
  <output>
    <result>10000000</result>
    <getCapability>
      <capability>
        <datePrints>54000000 54010000</datePrints>
      </capability>
    </getCapability>
  </output>
</dps>
```

F I G. 14C

```
<StartJob>

<?xml version="1.0" ?>
<dps xmlns="http://www.cipa.jp/dps/schema/">
  <input>
    <startJob>
      <jobConfig>
        <quality>50000000</quality>
        <paperSize>51010000</paperSize>
        <paperType>52020000</paperType>
        <fileType>53000000</fileType>
        <datePrint>54010000</datePrint>
        <fileNamePrint>55010000</fileNamePrint>
        <imageOptimize>56000000</imageOptimize>
        <layout>57010000</layout>
        <cropping>57010000</cropping>
      </jobConfig>
      <printInfo>
        <fileID>00000001</fileID>
        <fileName>Test0001</fileName>
        <date>2002/10/28</date>
      </printInfo>
      <printInfo>
        <fileID>00000002</fileID>
        <fileName>Test0002</fileName>
        <date>31 Oct, 2002</date>
        <croppingArea>0000 0000 0280 01E0</croppingArea>
        <copies>002</copies>
      </printInfo>
    </startJob>
  </input>
</dps>

<StartJob result>

<?xml version="1.0" ?>
<dps xmlns="http://www.cipa.jp/dps/schema/">
  <output>
    <result>10000000</result>
    <startJob />
  </output>
</dps>
```

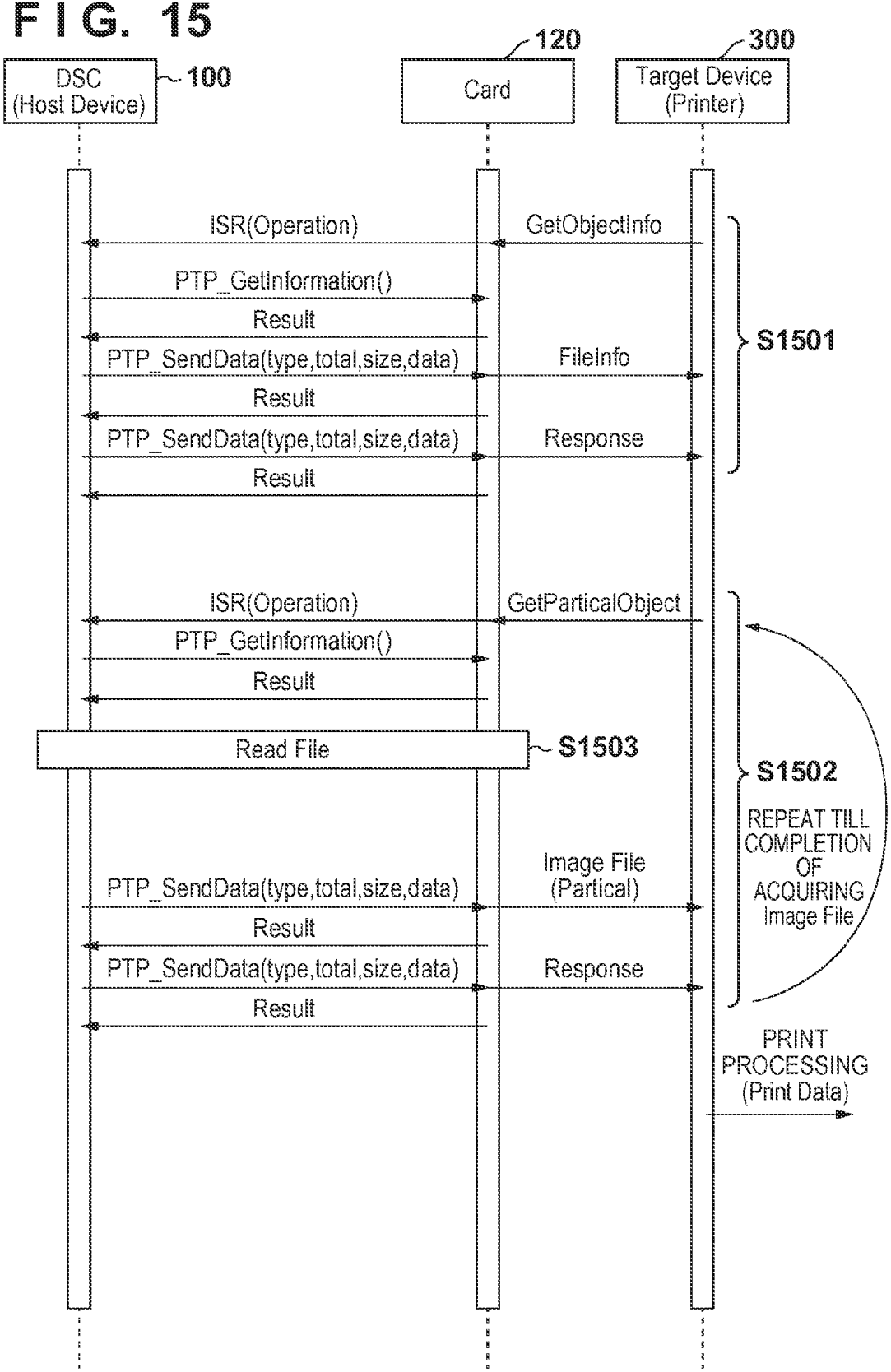

FIG. 17A

```
<NotifyDeviceStatus>

<?xml version="1.0" ?>
<dps xmlns="http://www.cipa.jp/dps/schema/">
  <input>
    <notifyDeviceStatus>
      <dpsPrintServiceStatus>70010000</dpsPrintServiceStatus>
      <jobEndReason>71000000</jobEndReason>
      <errorStatus>72010000</errorStatus>
      <errorReason>73010000</errorReason>
      <disconnectEnable>74010000</disconnectEnable>
      <capabilityChanged>75010000</capabilityChanged>
      <newJobOK>76000000</newJobOK>
    </notifyDeviceStatus>
  </input>
</dps>

<NotifyDeviceStatus result>

<?xml version="1.0" ?>
<dps xmlns="http://www.cipa.jp/dps/schema/">
  <output>
    <result>10000000</result>
    <notifyDeviceStatus />
  </output>
</dps>
```

FIG. 17B

```
<NotifyJobStatus>

<?xml version="1.0" ?>
<dps xmlns="http://www.cipa.jp/dps/schema/">
  <input>
    <notifyJobStatus>
      <progress>004/006</progress>
      <imagesPrinted>012</imagesPrinted>
    </notifyJobStatus>
  </input>
</dps>

<NotifyJobStatus result>

<?xml version="1.0" ?>
<dps xmlns="http://www.cipa.jp/dps/schema/">
  <output>
    <result>10000000</result>
    <notifyJobStatus />
  </output>
</dps>
```

RECORDING MEDIUM AND CONTROL METHOD THEREOF

TECHNICAL FIELD

The present invention relates to a recording medium and control method thereof.

BACKGROUND ART

Image capture apparatuses such as a digital camera popularly use a semiconductor memory card as a recording medium for saving image data obtained by shooting. When transferring recorded image data to an external apparatus such as a personal computer (to be referred to as a PC hereinafter), printer, or television receiver, the digital interfaces of the digital camera and external apparatus are generally connected by a cable (see Japanese Patent Laid-Open No. 2005-223710).

In data transfer between the digital camera and the external apparatus, data is conventionally exchanged according to a predetermined communication protocol on a physical transmission line such as a cable.

As data exchange protocols between a PC and a digital camera, PTP (Picture Transfer Protocol) defined by the Still Imaging Device Class of the USB, and a protocol defined by the Mass Storage Device Class are often adopted.

In particular, a PC in which Windows® or Mac OS® supporting PTP at the OS level runs recognizes a digital camera when the digital camera is connected to it. In response to this, the PC can perform an operation of, for example, automatically activating a data transfer application and starting data transfer. This reduces the user burden and improves user friendliness.

There is also proposed a PictBridge standard which defines a direct print procedure to directly connect a digital camera and printer and print. In the PictBridge standard, communication between apparatuses also uses PTP. If the digital camera supports PTP communication, the user suffices to similarly operate the digital camera regardless of whether an external apparatus connected to the digital camera is a PC or printer.

Recently, memory cards having a wireless communication function have been marketed to more easily transfer image data from a digital camera to an external device. When this memory card is attached to a digital camera and used, it can automatically transfer image data to an external device capable of wireless communication. The user need neither connect a cable nor input an explicit transfer instruction.

SUMMARY OF INVENTION

The present invention provides a recording medium having a wireless communication function usable for various application purposes.

According to an aspect of the present invention, there is provided a recording medium removable from a host device, comprising: wireless communication means for establishing wireless communication with an external device different from the host device by using a wireless communication protocol; image transmission control means capable of transmitting image data to the external device via the wireless communication established by the wireless communication means by using an image transmission protocol; and determination means for determining either the image transmission control means of the recording medium or image transmission control means of the host device, to which the recording medium is attached, is used to transmit image data via the wireless communication established by the wireless communication means.

According to another aspect of the present invention, there is provided a recording medium removable from a host device, comprising: wireless communication means for performing wireless communication with an external device different from the host device; a Responder module which performs communication conforming to PTP (Picture Transfer Protocol) or MTP (Multimedia Transfer Protocol) with the external device via the wireless communication means, and causes the recording medium to function as a Responder in the PTP or the MTP; and a controller which switches which of the Responder module of the recording medium and a Responder module of the host device, to which the recording medium is attached, that causes the host device to function as the Responder is used to perform PTP or MTP communication with the external device via the wireless communication means.

According to further aspect of the present invention, there is provided a method of controlling a recording medium removable from a host device different from an external device, the recording medium including: wireless communication means capable of establishing wireless communication with an external device by using a wireless communication protocol; and image transmission control means capable of transmitting image data to the external device via the wireless communication established by the wireless communication means by using an image transmission protocol, the method comprising: a determination step of determining either the image transmission control means of the recording medium or image transmission control means of the host device, to which the recording medium is attached, is used to transmit image data via the wireless communication established by the wireless communication means.

According to yet further aspect of the present invention, there is provided a method of controlling a recording medium which includes wireless communication means for performing wireless communication with an external device, and is removable from a host device different from the external device, the recording medium further including a Responder module which performs communication conforming to PTP (Picture Transfer Protocol) or MTP (Multimedia Transfer Protocol) with the external device via the wireless communication means, and causes the recording medium to function as a Responder in the PTP or the MTP, the method comprising the step of: switching which of the Responder module of the recording medium and a Responder module of the host device, to which the recording medium is attached, that causes the host device to function as the Responder is used to perform PTP or MTP communication with the external device via the wireless communication means.

Further features of the present invention will become apparent from the following description of exemplary embodiments with reference to the attached drawings.

BRIEF DESCRIPTION OF DRAWINGS

FIG. 11 is a sequence chart showing a modification of FIG. 10;

FIG. 13 is a sequence chart showing the operations (DPS ConfigurePrintService) of the DSC 100, memory card 120, and printer 300 in the DPS mode according to the embodiment of the present invention;

FIGS. 14A to 14C are views exemplifying scripts transmitted in DPS ConfigurePrintService, GetCapability, and StartJob;

FIG. 15 is a sequence chart showing the operations (DPS_GetFileInfo and DPS_GetFile) of the DSC 100, memory card 120, and printer 300 in the DPS mode according to the embodiment of the present invention;

FIGS. 17A and 17B are views exemplifying scripts transmitted in DPS_NotifyDeviceStatus and DPS_NotifyJobStatus.

DESCRIPTION OF EMBODIMENTS

Exemplary embodiments of the present invention will now be described in detail in accordance with the accompanying drawings.

A digital still camera (DSC) will be described as an example of an image capture apparatus using a memory card having a wireless communication function. However, the present invention is applicable to a camera or an arbitrary device including a camera, such as a digital video camera or camera-equipped portable electronic device. Also, a general-purpose computer apparatus (PC) and printer will be described as examples of an external device which wirelessly communicates with the DSC to provide a service or use image data held in the DSC. However, the external device may be an arbitrary device supporting PTP (Picture Transfer Protocol), such as a so-called smartphone, tablet terminal, or another digital camera.

Figure 1:
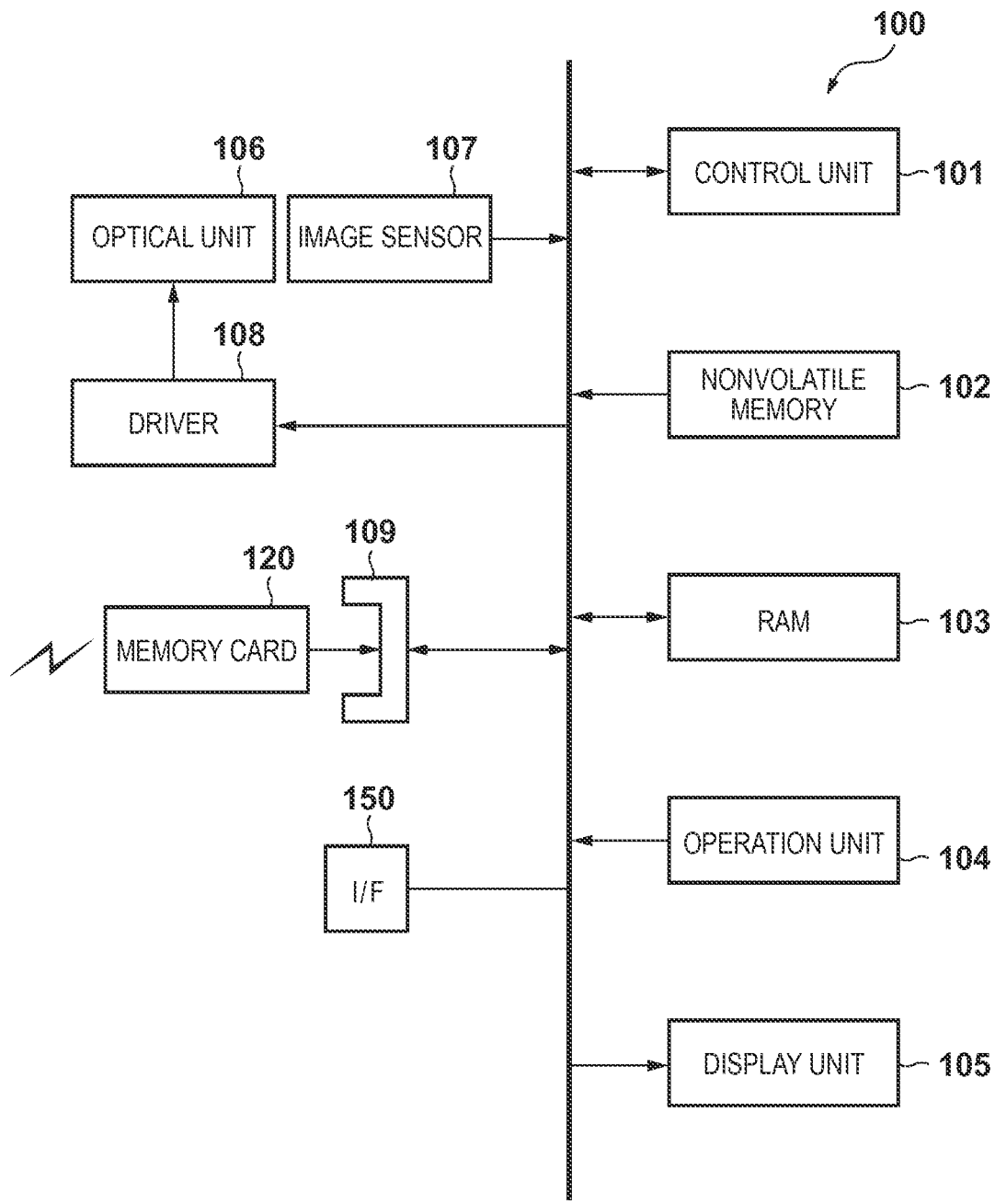
FIG. 1 is a block diagram exemplifying the functional arrangement of a digital still camera as an example of an image capture apparatus according to an embodiment of the present invention.

FIG. 1 is a block diagram exemplifying the functional arrangement of a DSC 100.

A control unit 101 is a programmable processor such as a CPU or MPU, and controls the overall DSC 100. A nonvolatile memory 102 stores the processing sequence (program) of the control unit 101, various settings of the DSC 100, GUI (Graphical User Interface) data such as a menu screen, and the like. A RAM 103 is used as the work area of the control unit 101. An operation unit 104 includes buttons and switches, and is used to input various instructions from the user to the DSC 100. A display unit 105 is, for example, an LCD (Liquid Crystal Display), and is used to display a shot image and a menu screen for making various settings. An optical unit 106 is mainly formed from lenses (for example, zoom lens and focus lens), actuators for driving them, and the like. An image sensor 107 is a CCD image sensor or CMOS image sensor. A driver 108 controls the optical unit 106 under the control of the control unit 101. A connector 109 is a connector for connecting a memory card 120 serving as a removable recording medium. As will be described later, the memory card 120 in the embodiment has a wireless communication function. An interface (I/F) 110 is a digital interface such as a USB, IEEE1934, or HDMI interface, and is used to connect an external device by wired connection.

Figure 2:
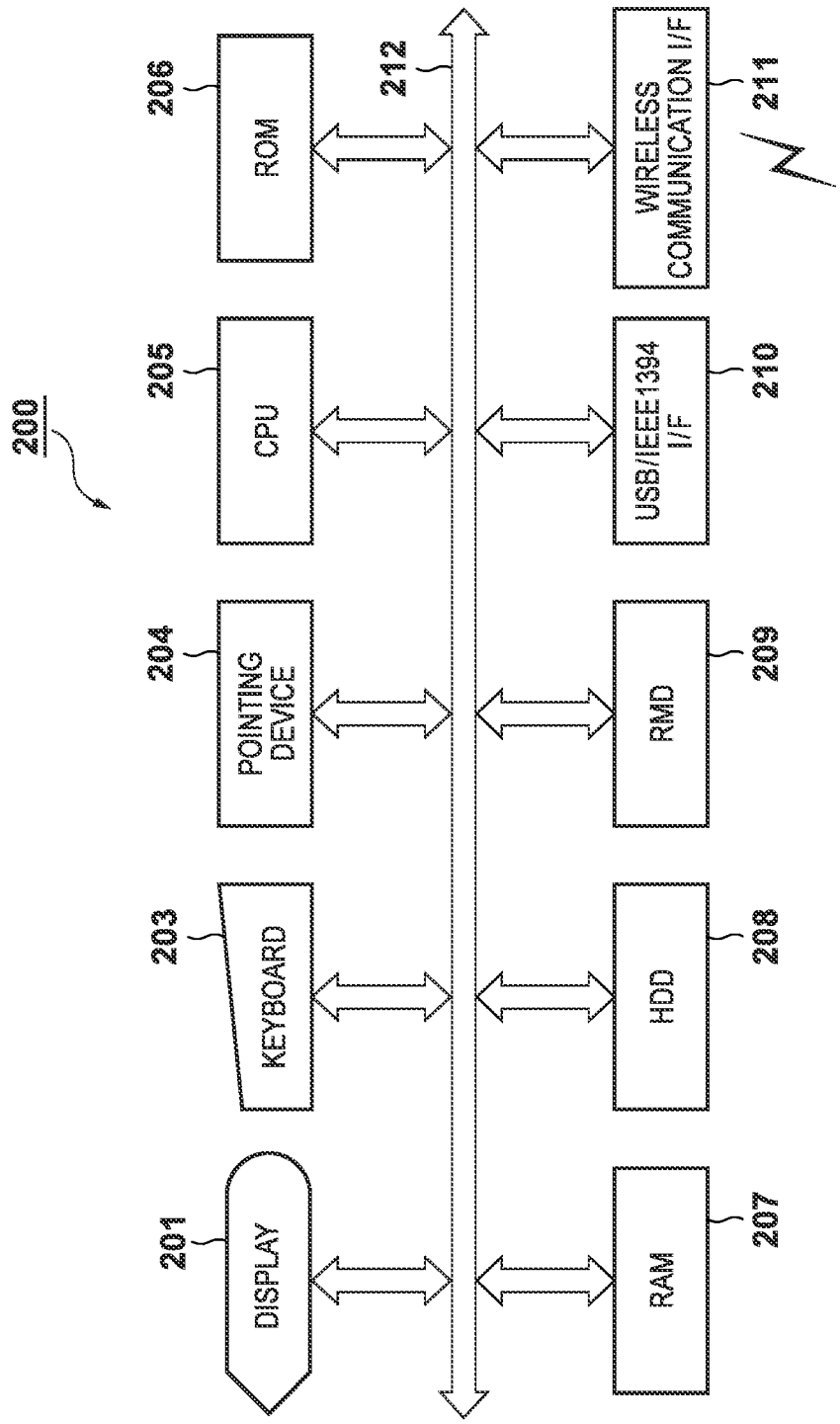
FIG. 2 is a block diagram exemplifying the functional arrangement of a general-purpose computer apparatus as an example of an external apparatus according to the embodiment of the present invention.

FIG. 2 is a block diagram exemplifying the arrangement of a general-purpose computer apparatus (PC) 200 as an example of an external apparatus in the embodiment.

Referring to FIG. 2, a display 201 is formed from an LCD or the like, and displays various GUIs and data. A keyboard 203 and pointing device 204 are used to input a character and the like, and indicate an icon, button, and the like on the GUI. A CPU 205 controls the overall PC 200.

A ROM (Read Only Memory) 206 stores programs (mainly, boot program) to be executed by the CPU 205, parameters, and the like. A RAM (Random Access Memory) 207 is used as a work area when executing various programs by the CPU 205, a temporary save area in error processing, and the like.

A hard disk drive (HDD) 208 stores programs to be executed by the CPU 205, such as an OS and application programs, and stores user data. The HDD 208 is also used as a virtual storage area. Assume that the HDD 208 stores programs for implementing various functions of the PC 200 to be described in the embodiment.

A removable medium drive (RMD) 209 is a device which performs read/write from/in or readout from a removable recording medium. Examples of the RMD 209 are a flexible disk drive, optical disk drive, magneto-optical disk drive, memory card reader, and removable HDD.

A USB/IEEE1394 I/F 210 is an example of an interface for wired-connecting various peripheral devices including a printer.

A wireless communication I/F 211 is an interface for connecting the PC 200 to a wireless communication network. A bus 212 includes an address bus, data bus, and control bus, and connects the above-described units to each other.

Figure 3:
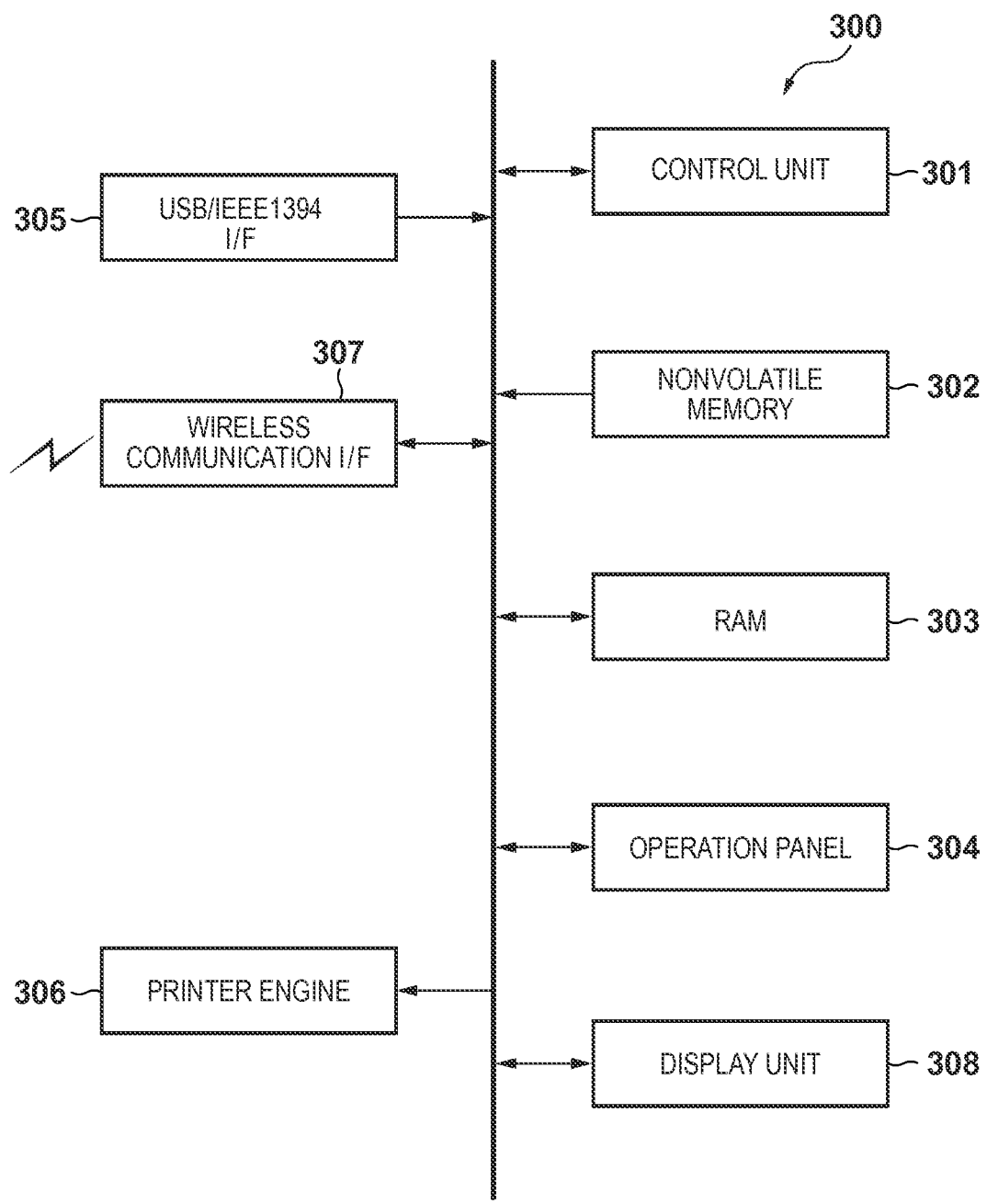
FIG. 3 is a block diagram exemplifying the functional arrangement of the control system of a printer as another example of an external apparatus according to the embodiment of the present invention.

FIG. 3 is a block diagram exemplifying the arrangement of the control system of a printer 300 as an example of an external apparatus in the embodiment.

Referring to FIG. 3, a control unit 301 is a programmable processor such as a CPU or MPU, and controls the DSC 100. A nonvolatile memory 102 stores the processing sequence (program) of the control unit 101, fonts, various settings of the printer 300, GUI data such as a menu screen, and the like. A RAM 303 is used as the work area of the control unit 301. An operation panel 304 includes buttons and switches, and is used to input various instructions from the user to the printer 300. A display unit 308 is, for example, an LCD and is used to display image data to be printed and a menu screen used to make various settings. A USB/IEEE1394 I/F 305 is an interface for wired-connecting a host device (for example, PC 200). A wireless communication interface 307 is an interface for connecting the printer 300 to a wireless communication network. A printer engine 306 is a print engine which discharges liquid ink using thermal energy in the embodiment, but the printing method is not limited to this.

Figure 4:
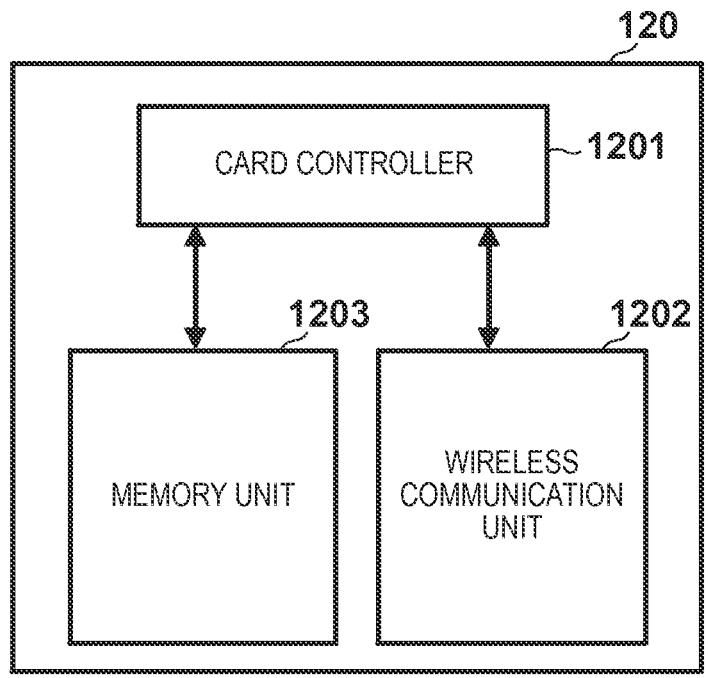
FIG. 4 is a block diagram exemplifying the functional arrangement of a memory card 120 in FIG. 1.

FIG. 4 is a block diagram exemplifying the functional arrangement of the memory card 120 in FIG. 1. The memory card 120 includes a card controller 1201, wireless communication unit 1202, and memory unit 1203.

The card controller 1201 includes, for example, a CPU, ROM, and RAM, and implements the operation of the memory card 120 to be described later. Control of the wireless communication unit 1202, PTP communication with an external device on a wireless communication network, PTP communication with the DSC 100 serving as a host device, the operation of a recording medium in the DSC 100, and the like are implemented under the control of the card controller 1201.

The wireless communication unit 1202 has a wireless communication function conforming to a wireless communication standard such as IEEE802.11x or Bluetooth®, and implements communication with an external device on a wireless communication network. In the embodiment, the wireless communication unit 1202 has a wireless communication function conforming to the IEEE802.11a/b/g/n standards.

The memory unit 1203 includes, for example, a NAND nonvolatile memory, and stores data such as still images, moving images, and sounds written via the card controller 1201. Assume that the memory card 120 records a file in conformity with a predetermined file system such as DCF (Design rule for Camera File system) to function as the recording medium of the DSC 100.

Figure 5:
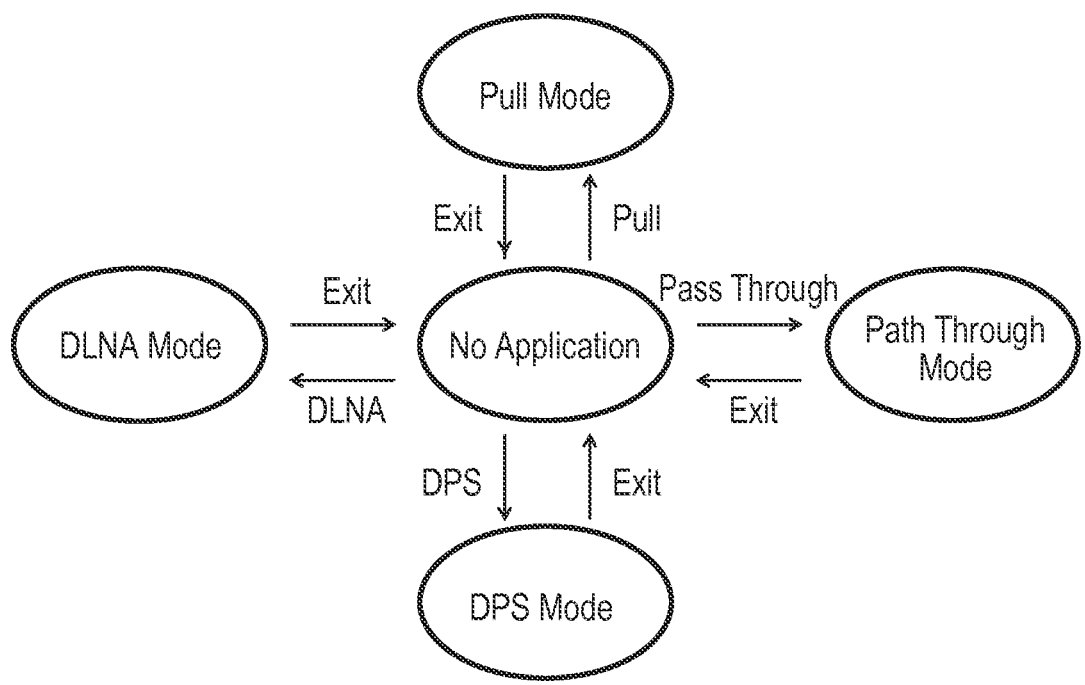
FIG. 5 is a state transition view of the memory card 120 in FIG. 1.

FIG. 5 is a state transition view of the memory card 120 in the embodiment. As will be described later, the memory card 120 can switch the Application mode in accordance with a command from the DSC 100 serving as a host device. Assume that one of the DLNA (Digital Living Network Alliance) mode, pull (Pull) mode, path through (Path Through) mode, and DPS (Digital Photo Solutions for Imaging Devices) mode is settable as the Application mode.

The DLNA mode is an operation mode in which the memory card 120 is wirelessly connected to the network of home appliances and the like conforming to the DLNA guideline, and communicates with a home appliance on the network such as a television set.

The Pull mode is a mode in which the memory card 120 PTP-communicates with an external device on a wireless communication network basically independently of the DSC 100 serving as a host device.

The Path Through mode is an operation mode in which the memory card 120 functions as if it was the wireless communication adapter of the DSC 100, and enables PTP communication between the DSC 100 and an external device on a wireless communication network.

The DPS mode is an operation mode which implements direct print using a printer present on a wireless network.

As shown in FIG. 5, direct transition between these Application modes is impossible, and the Application mode is always changed via the No Application mode. In the No Application mode, the memory card 120 performs an operation necessary to maintain network connection, search for a connectable network, and the like.

Figure 6:
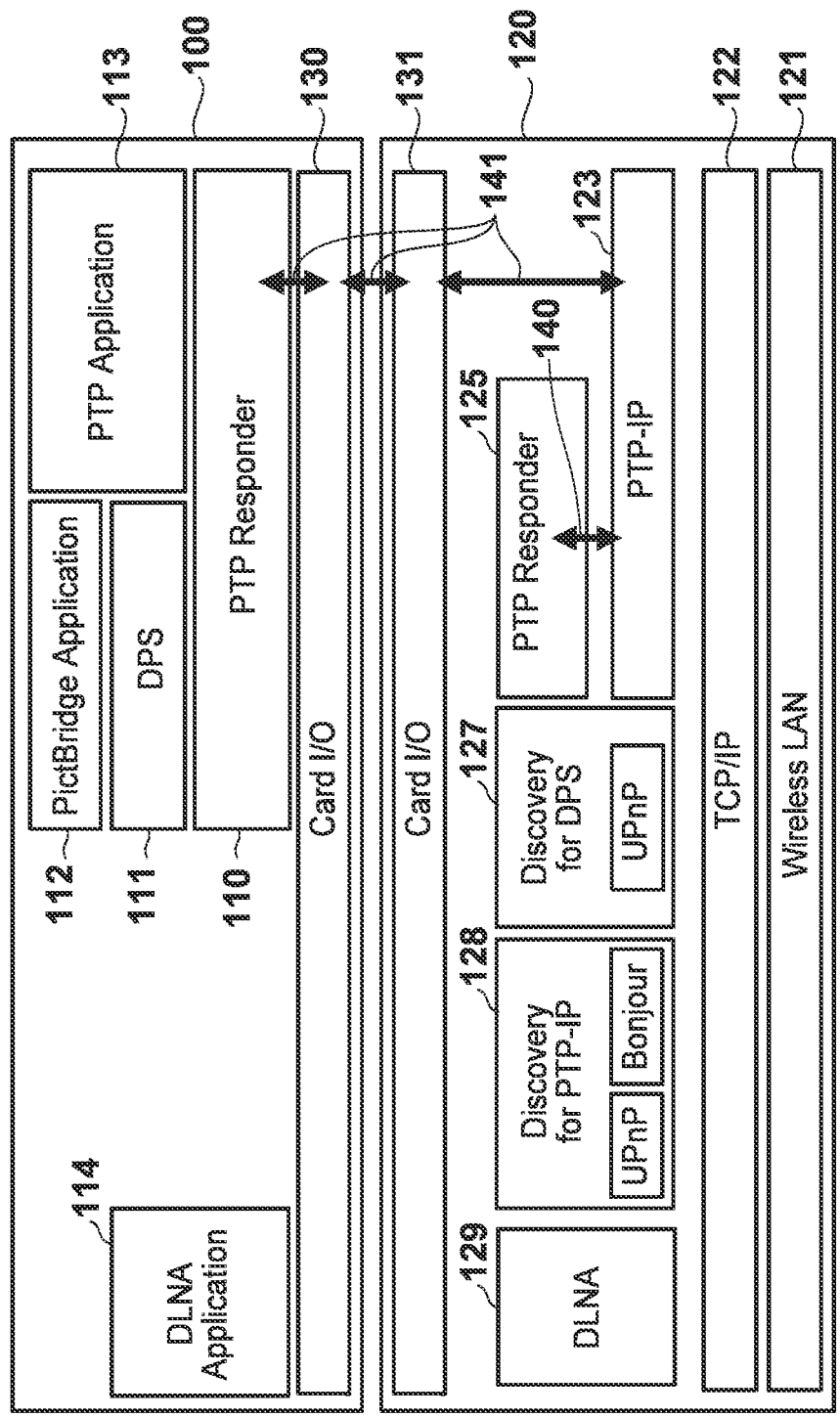
FIG. 6 is a view for explaining software modules implemented in a DSC 100 and the memory card 120, and their hierarchical relationship in the embodiment of the present invention.

FIG. 6 is a view for explaining typical software modules implemented in the DSC 100 and memory card 120, and their hierarchical relationship in the embodiment. For example, each software module shown in FIG. 6 is stored in a program storage area in the nonvolatile memory 102 for the DSC 100 and the nonvolatile memory in the card controller 1201 for the memory card 120. Note that one or more software modules shown in FIG. 6 may be implemented by hardware logic.

As shown in FIG. 6, in the embodiment, both the DSC 100 and memory card 120 include PTP Responder modules for operating these devices (DSC 100 and memory card 120) as PTP Responders which respond to a request from Initiators in PTP. PTP Responder modules 110 and 120 may be MTP (Media Transfer Protocol) Responders supporting MTP, which is a forward compatible protocol of PTP.

The DSC 100 and memory card 120 communicate with each other using Card I/O modules 130 and 131. The Card I/O modules 130 and 131 in the embodiment perform communication conforming to SDIO (Secure Digital Input/Output), but another communication method may be employed. The Card I/O modules 130 and 131 communicate PTP operations from the PTP Responders 110 and 125 or a PTP-IP module 123 (to be described later) as commands corresponding to the Card I/O modules 130 and 131, implementing delivery of PTP operations between the DSC 100 and the memory card 120.

Needless to say, the memory card 120 in the embodiment is also available as a general recording medium used in recording of image data obtained by image capturing and the like. In this case, the Card I/O modules 130 and 131 are used as communication modules for an interface (memory interface) which accesses the memory unit 1203. Note that a communication method for handling a PTP operation, and a communication method for accessing the memory unit 1203 may be different. For example, it is possible to use a communication method in the SD memory mode when the memory card 120 is used as general recording medium, and a communication method in the SDIO mode for delivery of a PTP operation.

In accordance with an Application mode set for the memory card 120, either the PTP Responder module 110 or 125 wirelessly communicates with an external apparatus using the PTP-IP ("Picture Transfer Protocol" over TCP/IP networks or PTP over IP) module 123, a TCP/IP module 122, and Wireless LAN module 121 arranged in the memory card 120. In addition, communication commands in the Card I/O module are newly defined to implement an operation in each Application mode. The communication commands include a command which sets an Application mode for the memory card 120 from the DSC 100 a command which requests, from the DSC 100 to the memory card 120, transfer of a PTP operation and data received by the memory card 120 from an external apparatus a command which requests transfer of a PTP operation and data from a module in the DSC 100 to an external apparatus a command which requests write of data received by the memory card 120 from an external apparatus in the memory unit 1203 a command which requests transmission of data saved in the memory unit 1203 of the memory card 120 to an external apparatus Note that PTP uses ObjectHandle to specify each object (data file or directory) recorded in the memory unit 1203. Hence, ObjectHandle needs to be allocated to each object in accordance with the file structure of the memory unit 1203. The PTP Responder modules 110 and 125 allocate ObjectHandle to each object, and create and manage ObjectHandleArray serving as an array of ObjectHandles. When a plurality of memory cards exist, the PTP Responder modules 110 and 125 also issue and manage StorageID and the like.

As described above, the control unit 101 can specify the full path of a file, and read and write data from and in the memory card 120, similar to a general memory card. For example, when a PTP operation requests read/write of an object specified by ObjectHandle, the control unit 101 can access the memory card 120 using a directory path by referring to ObjectArray. In this case, the directory path is a path (full path or absolute path) from a root directory.

A DPS module 111 and a PictBridge Application 112 on the upper layer of the DPS module 111 are software modules for implementing an operation conforming to the PictBridge direct print standard for printing directly by the printer from the DSC 100 (without the mediacy of a PC).

An Application module 113 implements an operation corresponding to each Application mode described above.

A DLNA Application module 114 and DLNA module 129 provide an operation conforming to DLNA. DLNA does not use PTP, so a description thereof will be omitted in the embodiment.

In the memory card 120, the Wireless LAN module 121 provides a physical layer conforming to IEEE802.11x. The TCP/IP module 122 provides a transport layer. The PTP-IP module 123 is a module for PTP communication on a TCP/IP network.

A Discovery for DPS module 127 is a module for performing discovery in the DPS mode. In the embodiment, the Discovery for DPS module 127 executes discovery using UPnP (Universal Plug and Play).

A Discovery for PTP-IP module 123 is a module for performing advertisement of discovery processing in the Pull mode and Path Through mode. In the embodiment, the Discovery for PTP-IP module 123 performs discovery using both UPnP (Universal Plug and Play) and Bonjour protocols.

The following explanation contains a description in which the module itself serves as the subject or object of processing. In practice, however, the control unit 101 and card controller 1201 execute processing using corresponding modules.

The operations of the DSC 100 and memory card 120 in each Application mode will be explained.

Figure 7:
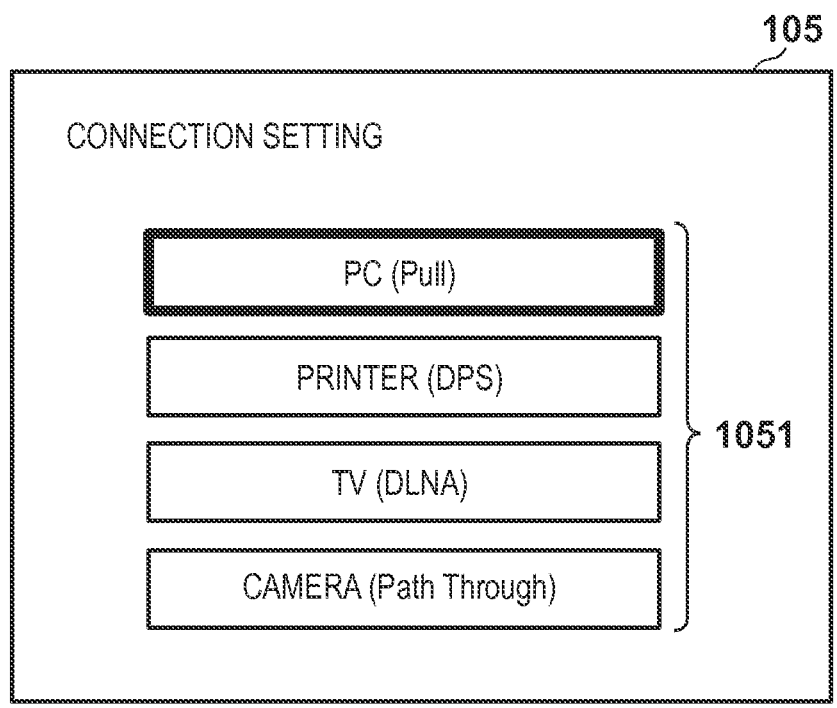
FIG. 7 is a view exemplifying a GUI screen for setting an Application mode for the memory card 120 in the DSC 100 according to the embodiment of the present invention.

Before a description of a detailed operation, a method of setting an Application mode for the memory card 120 will be explained. FIG. 7 is a view exemplifying a GUI screen for setting an Application mode for the memory card 120 in the DSC 100. The control unit 101 displays a setting screen in FIG. 7 on the display unit 105 in accordance with an instruction from the operation unit 104. The user can select the type of device he wants to connect from four choices using, for example, directional keys contained in the operation unit 104, and press the OK button to set the type of connection destination device. The control unit 101 detects the instruction content from the operation content of the operation unit 104 and the content of the GUI screen, and executes the designated operation.

In the example shown in FIG. 7, a PC is selected as a connection destination device. If the user presses the OK button in this state, the control unit 101 sets the Pull mode for the memory card 120. If another choice is selected when the OK button is pressed, the control unit 101 sets a corresponding Application mode for the memory card 120. As will be described later, the control unit 101 notifies the card controller 1201 of an Application mode by commands communicated via the Card I/O modules 130 and 131. The card controller 1201 functions in accordance with the notified mode.

Note that the Application mode setting method is not limited to the example shown in FIG. 7. For example, a menu for prompting the user to select which of DLNA and PTP is used may be prepared, and if the user selects to use PTP, a menu for prompting the user to select one of the Pull mode, DPS mode, and Path Through mode may be displayed.

According to the embodiment, the control unit 101 of the DSC 100 sets an Application mode for the card controller 1201 of the memory card 120 in accordance with the type of device the user wants to connect. The DSC 100 and memory card 120 perform an operation complying with the set Application mode.

(Operation in Pull Mode)

Figure 8:
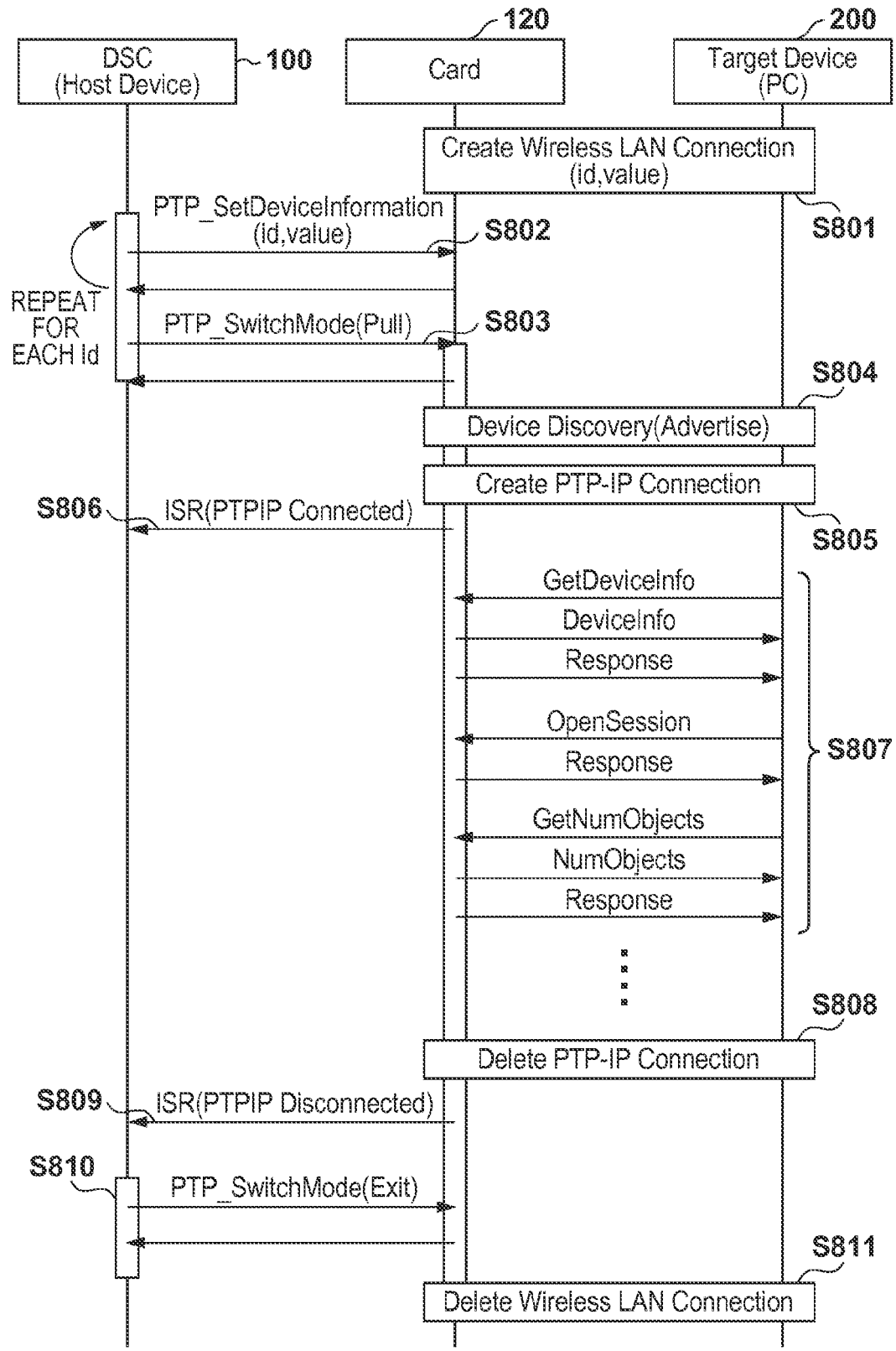
FIG. 8 is a sequence chart showing the operations of the DSC 100, the memory card 120, and a PC 200 in the Pull mode according to the embodiment of the present invention.

FIG. 8 is a sequence chart showing the operations of the DSC 100, memory card 120, and PC 200 serving as an example of an external device in the Pull mode. Note that communication between the DSC 100 and the memory card 120 shown in FIG. 8 represents commands exchanged between the Card I/O modules 130 and 131, unless otherwise specified. In the Pull mode, the PTP Responder module 125 in the memory card 120 communicates with the PTP-IP module 123 to implement communication with a PTP Initiator in the external device. That is, inter-module communication indicated by an arrow 140 in FIG. 6 is performed. The following description assumes that the PC 200 functions as a PTP Initiator. The PTP-IP module 123 performs communication with the PC 200.

Assume that the power supply of the DSC 100 to which the memory card 120 is attached is ON, then the memory card 120 searches for a network communicable by the wireless communication unit 1202, and if a communicable network is detected it automatically connects to it. Also, assume that the memory card 120 connects to the same network as that of the PC 200 in step S801 of FIG. 8.

If the wireless communication unit 1202 has succeeded in network connection, the card controller 1201 of the memory card 120 notifies the control unit 101 of the DSC 100 serving as a host device of the successful network connection.

Step S802: If the control unit 101 of the DSC 100 is notified of the network connection, it transmits, to the memory card 120 using a PTP_SetDeviceInformation command, information to be advertised on the network in PTP Device Discovery and information to be notified to an Initiator by a PTP operation. The PTP_SetDeviceInformation command can notify the name, model, vendor, UUID (Universally Unique Identifier), and serial number of an apparatus. When there are pieces of information to be notified, the control unit 101 repetitively transmits the PTP_SetDeviceInformation command for each piece of information.

Even when the card controller 1201 does not receive information notified by the PTP_SetDeviceInformation command from the DSC 100, it can perform PTP Device Discovery and the like using initial values held in the card controller 1201.

The card controller 1201 reflects, in DeviceInfo DataSet saved in the memory of the card controller 1201, information notified by the PTP_SetDeviceInformation command received before setting the Application mode of the memory card 120.

Step S803: After the end of notifying the memory card 120 of information necessary for Device Discovery, the control unit 101 of the DSC 100 issues a PTP_SwitchMode command, and sets the Application mode of the memory card 120. In this case, PTP_SwitchMode (pull) is issued to set the Pull mode for the memory card 120.

Note that the Pull mode is a mode in which the DSC 100 is not involved in communication between the memory card 120 and the external device (PC 200) in principle. For example, in the Pull mode, the card controller 1201 may be set to automatically transfer data in the memory unit 1203 when connection with the PC 200 registered in advance as a data transfer destination or a server on the Internet becomes possible. Hence, as for the memory card 120 in the Pull mode, an operation to change the contents of the memory unit 1203 of the memory card 120 from the DSC 100 is inhibited. More specifically, the use of a memory interface for accessing the memory unit 1203 from the DSC 100 is inhibited.

Step S804: The card controller 1201 performs Device Discovery (Advertise) on the connected network using the Discovery for PTP-IP module 123 and wireless communication unit 1202. In this case, the card controller 1201 advertises, on the network, the device information received from the DSC 100 in step S802.

Step S805: Upon receiving a connection request from the PC 200 functioning as a PTP Initiator, the card controller 1201 establishes a PTP-IP connection between the PTP Responder module 125 and the PTP Initiator module in the PC 200.

Step S806: The card controller 1201 notifies the control unit 101 of the DSC 100 using an interrupt signal ISR (PTPIP Connected) that the PTP-IP connection with the external device (PC 200) has been established. If the use of the memory interface is not inhibited at this time, the control unit 101 inhibits it. Accordingly, a shooting operation, image data deletion operation, and the like are inhibited. Alternatively, a shooting operation may be permitted as long as images can be recorded in the built-in memory.

Step S807: The memory card 120 and external device (PC 200) start a PTP session to transfer data from the memory card 120 serving as a Responder. For example, the session starts by an OpenSession operation for the start of a session, following a GetDeviceInfo operation which requests information of the memory card. After that, a GetStorageIDs operation which requests a StorageID valid in the memory card 120, a GetNumObjects operation which requests the number of objects contained in a medium specified by StorageID, and the like are issued. A data transfer sequence from the memory card 120 using PTP is well known, and a detailed description thereof will be omitted.

Step S808: After the end of the session, the card controller 1201 cancels the PTP-IP connection between the PTP Responder module 125 and the PTP Initiator module of the PC 200.

Step S809: The card controller 1201 notifies the control unit 101 using an interrupt signal ISR (PTPIP Disconnected) of the cancellation of the PTP-IP connection. Upon receiving this notification, the control unit 101 cancels the inhibition of the use of the memory interface.

Step S810: The control unit 101 issues a PTP_SwitchMode (exit) command to return the operation mode of the memory card 120 to the No Application mode. In accordance with this command, the card controller 1201 sets the memory card 120 in the No Application mode, and starts an operation in the No Application mode. Note that the inhibition of the use of the memory interface may be canceled not after step S809 but after step S810.

Step S811: The card controller 1201 can end the network connection, as needed, for example, when the power supply of the DSC 100 is turned off or when an instruction to invalidate the wireless communication function is issued.

(Operation in Path Through Mode)

Next, the operations of the DSC 100, memory card 120, and PC 200 serving as an example of an external device in the Path Through mode will be explained. The Path Through mode is a mode which implements a PTP session between the DSC 100 and the external device. In the Path Through mode, the PTP Responder module 110 in the DSC 100 communicates with the PTP-IP module 123 via the Card I/O modules 130 and 131 to implement communication with the PC 200 serving as an Initiator. That is, inter-module communication indicated by arrows 141 in FIG. 6 is performed. The PTP-IP module 123 performs communication with the PC 200.

Figure 9:
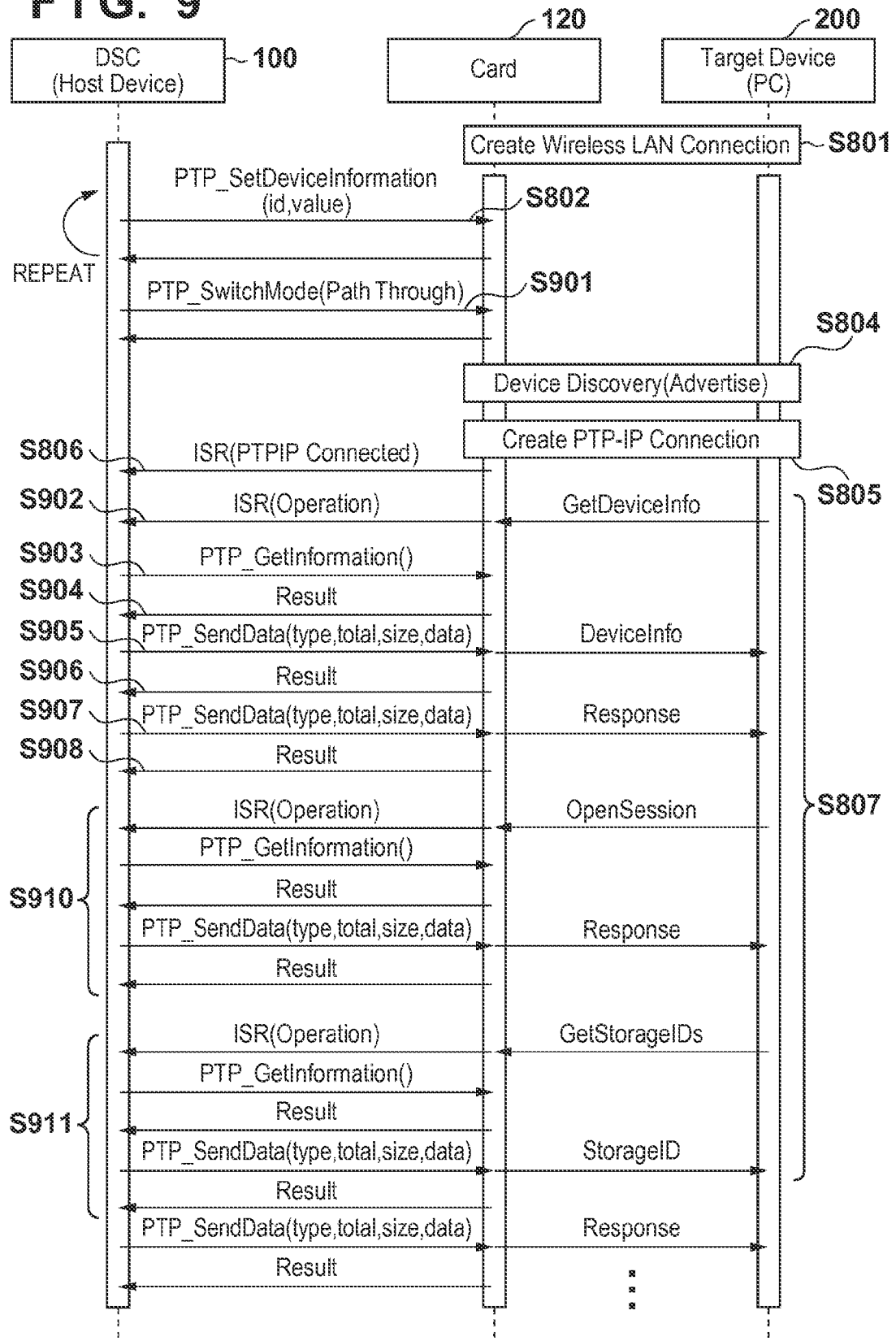
FIG. 9 is a sequence chart showing the operations of the DSC 100, memory card 120, and PC 200 till after the start of a PTP session in the Path Through mode according to the embodiment of the present invention.

FIG. 9 is a sequence chart showing the operations of the DSC 100, memory card 120, and PC 200 serving as an example of an external device till after the start of a PTP session in the Path Through mode. Note that communication between the DSC 100 and the memory card 120 shown in FIG. 9 represents commands exchanged between the Card I/O modules 130 and 131, unless otherwise specified. Assume that, when the DSC 100 receives a command regarding a PTP operation from the memory card 120, the Card I/O module 130 transfers the command as a PTP operation to the PTP Responder module 110. The same reference numerals as those in FIG. 8 denote the same operations, and a description thereof will not be repeated.

A sequence until the control unit 101 of the DSC 100 is notified of the establishment of a PTP-IP connection using an interrupt signal ISR (PTP IP Connected) is the same as that in the Pull mode except that the Path Through mode is set by a PTP_SwitchMode command in step S901. Setting of discovery information by a PTP_SetDeviceInformation command in step S802 need not be repetitively performed if the discovery information has already been set.

As described above, in the Path Through mode, the memory card 120 functions as a relay device in PTP communication between the external device (PC 200) and the DSC 100. Thus, the Path Through mode looks the same as the Pull mode when viewed from (the PTP Initiator module of) the PC 200. However, a PTP Responder module which performs PTP communication in the Path Through mode is not the PTP Responder module 125 in the memory card 120 but the PTP Responder module 110 in the DSC 100. The card controller 1201 switches the PTP-IP module 123 to perform PTP communication not with the PTP Responder module 125 but with the PTP Responder module 110 in the DSC 100.

When the Path Through mode is set, the card controller 1201 inhibits access to the memory unit 1203 until PTP_SwitchMode (Exit) is received, except for a case in which a command or instruction is received from the DSC 100.

An operation in the Path Through mode will be explained for a GetDeviceInfo operation.

Step S902: The card controller 1201 notifies the control unit 101 using an interrupt signal ISR(Operation) that an operation has been received from the PTP Initiator module of the PC 200. At this time, neither the type nor content of the received operation is notified, and only the reception of the operation is notified.

Step S903: In response to the notification, the control unit 101 issues a PTP_GetInformation command to acquire the content of the operation.

Step S904: The card controller 1201 transmits the received operation (GetDeviceInfo) to the control unit 101. Then, the PTP Responder module 110 of the DSC 100 receives the PTP operation from the PTP Initiator module of the PC 200.

Step S905: The control unit 101 transmits, to the card controller 1201 using a PTP_SendData command, DeviceInfo as a response to the GetDeviceInfo operation. Then, DeviceInfo is transmitted to the PC 200 via the PTP-IP module 123 in the memory card 120.

Step S906: The card controller 1201 notifies the control unit 101 of the completion of transmission of DeviceInfo.

Step S907: The control unit 101 transmits Response information to the card controller 1201 using a PTP_SendData command to transmit Response to the PTP Initiator module.

Step S908: The PTP-IP module 123 transmits Response to the PTP Initiator module, and the card controller 1201 notifies the control unit 101 of the completion of transmission.

Note that Response transmitted in steps S906 to S908 is information which is determined to be sent back upon receiving a PTP operation. The Initiator side is notified of a processing result such as an error code or OK.

Steps S910 and S911: As for an OpenSession operation and GetStorageID operation from the PC 200, the control unit 101 sends back a response, similarly to the case in which the GetDeviceInfo operation is received.

Figure 10:
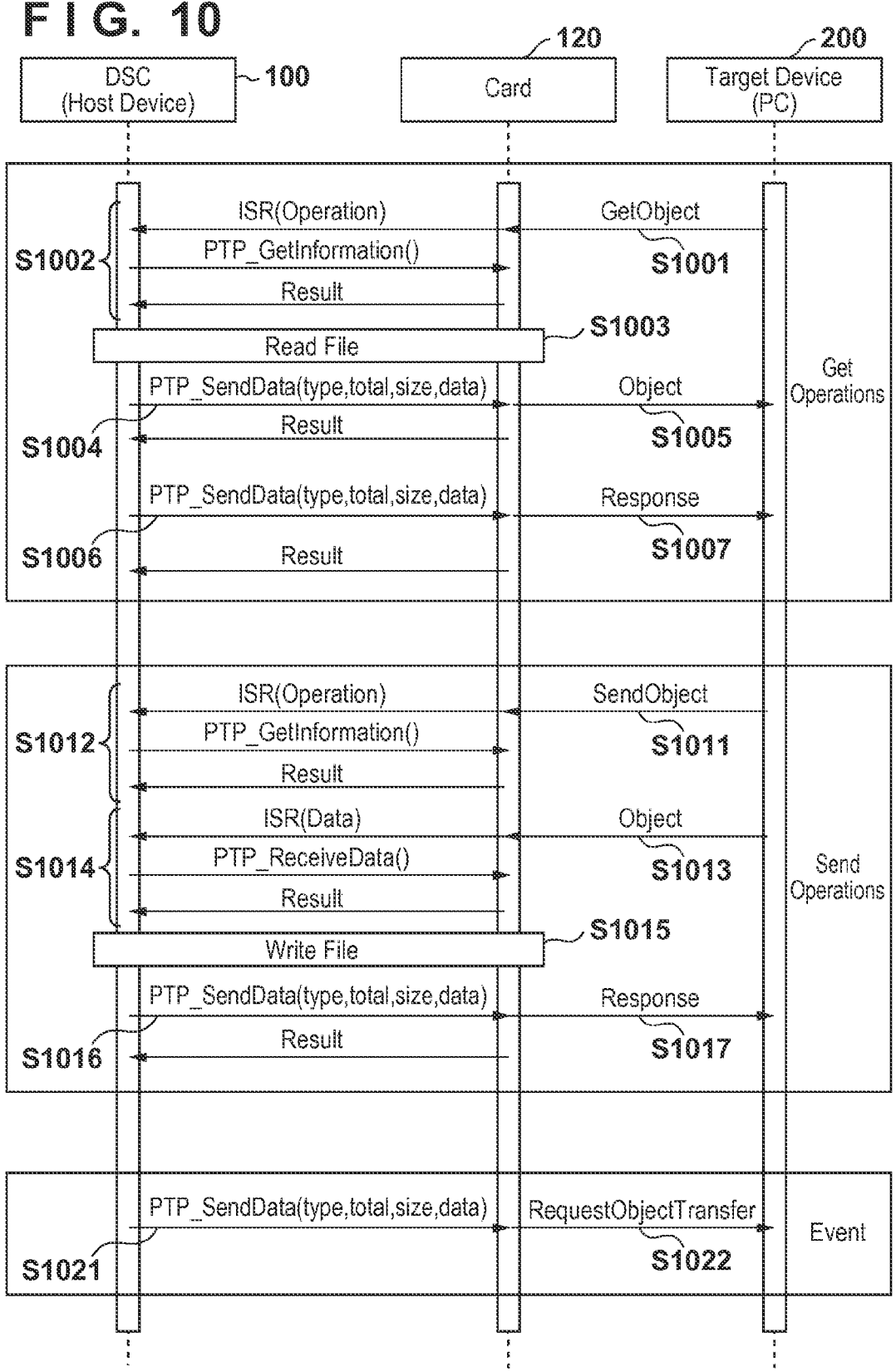
FIG. 10 is a sequence chart showing the operations of the DSC 100, memory card 120, and PC 200 according to the embodiment of the present invention when an object transmission/reception request is received from an external device after the start of a PTP session in the Path Through mode and when an event occurs.

After that, processing of necessary PTP operations is executed till a data transfer request. FIG. 10 is a sequence chart showing the operations of the DSC 100, memory card 120, and PC 200 serving as an example of an external device when an object transmission/reception request is received from an external device after the start of a PTP session in the Path Through mode and when an event occurs.

First, processing for an object transmission request will be explained.

Step S1001: The card controller 1201 receives a GetObject operation from the PC 200 via the PTP-IP module 123.

Step S1002: Similar to steps S902 to S904, the control unit 101 receives the GetObject operation from the card controller 1201.

Step S1003: The control unit 101 specifies a directory path and reads out, from the memory unit 1203, an object specified by ObjectHandle of the GetObject operation via the memory interface without using PTP. This readout does not use the PTP Responder module 110, and processing from a so-called general memory card is performed. As described above, a directory path corresponding to ObjectHandle can be known by referring to ObjectHandleArray.

Step S1004: The control unit 101 transmits the readout object to the card controller 1201 using a PTP_SendData command.

Step S1005: The card controller 1201 transmits an object requested by the GetObject operation to the PTP Initiator module of the PC 200 using the PTP-IP module 123.

Steps S1006 and S1007: ResponseCode for the GetObject operation is transmitted from the control unit 101 to the PTP Initiator module of the PC 200 via the card controller 1201 and PTP-IP module 123.

Next, an object reception request will be explained.

Step S1011: The PTP-IP module 123 of the memory card 120 receives a SendObject operation from the PC 200.

Steps S1012: Similar to steps S902 to S904, the control unit 101 receives the SendObject operation from the card controller 1201.

Step S1013: The card controller 1201 receives an object from the PC 200 via the PTP-IP module 123. The received object is buffered in the memory card 120 (for example, RAM in the card controller 1201).

Step S1014: The card controller 1201 notifies the control unit 101 using an interrupt signal ISR (Data) that the object has been received. The control unit 101 issues a PTP ReceiveData command, and receives the object from the card controller 1201.

Step S1015: The control unit 101 specifies a directory path (full path or absolute path), and writes the received object in the memory unit 1203 via the Card I/O modules 130 and 131. This write does not use the PTP Responder 110, and write processing in a so-called general memory card is performed. Note that a directory in which the object is written is specified by the PC 200 in a SendObjectInfo operation preceding the SendObject operation, or is determined by the PTP Responder module 110 upon receiving a SendObjectInfo operation. A path name (including a file name) subjected to write can be determined according to, for example, DCF.

Steps S1016 and S1017: ResponseCode to the SendObject operation is transmitted from the control unit 101 to the PTP Initiator module of the PC 200 via the card controller 1201 and PTP-IP module 123.

Next, an operation in transmission of an event packet will be explained. The event packet is a packet which requests the Initiator to issue a data acquisition request (GetObject) when transmitting data (PTP packet) from the Responder to the Initiator (for example, when notifying an error).

Step S1021: The control unit 101 sets an event packet as the packet type and transmits ObjectHandle using a PTP_SendData command.

Step S1022: The card controller 1201 recognizes that the received data is the event packet, and transmits a RequestObjectTransfer event containing the received ObjectHandle to the PTP Initiator module of the PC 200 via the PTP-IP module 123.

Then, the Initiator issues a GetObject operation which specifies ObjectHandle contained in the RequestObjectTransfer event.

In the sequence of FIG. 10, when transmitting data in the memory card 120 to the PC 200, data needs to be read out from the memory card 120 to the DSC 100 without using PTP, and transmitted from the DSC 100 to the memory card 120 by a PTP operation. Also when writing data received from the PC 200 in the memory card 120, data buffered in the memory card 120 needs to be acquired by the DSC 100 by a PTP operation, and written in the memory card 120 without using PTP. A modification which omits data exchange between the memory card and the DSC will be explained with reference to a sequence chart shown in FIG. 11. In FIG. 11, the same reference numerals as those in FIG. 10 denote the same operations, and a description thereof will not be repeated.

First, an operation for the GetObject operation will be explained.

Step S1101: The control unit 101 receives a GetObject operation in exchange in step S1002. The control unit 101 transmits a directory path (full path or absolute path) corresponding to ObjectHandle specified by the GetObject operation by using a PTP_SendFile command.

Step S1005: The card controller 1201 reads out, from the memory unit 1203, an object corresponding to the directory path specified by the PTP_SendFile command. Then, the card controller 1201 transmits the readout object to the PTP Initiator module of the PC 200 via the PTP-IP module 123.

Step S1102: The control unit 101 transmits a Read PTP Progress command to create ResponseCode, and acquires the transmission result of the object requested by the GetObject operation. The card controller 1201 sends back the transmission result via the PTP-IP module 123.

Step S1006: The control unit 101 creates ResponseCode based on the transmission result of the object requested by the GetObject operation, and transmits it to the card controller 1201 by using a PTP_SendData command.

Step S1007: The card controller 1201 transmits the data (ResponseCode) transmitted by the PTP_SendData command to the PTP_Initiator module of the PC 200 via the PTP-IP module 123.

Next, an operation for the SendObject operation will be explained.

Step S1101: The control unit 101 receives a SendObject operation in exchange in step S1012.

Step S1013: The card controller 1201 receives an object from the PC 200 via the PTP-IP module 123. The received object is buffered in the memory card 120 (for example, RAM in the card controller 1201).

Step S1111: The card controller 1201 notifies the control unit 101 using an interrupt signal ISR (Data) that the object has been received.

Step S1112: The control unit 101 transmits a directory path (full path or absolute path) representing the write location and file name of the received object to the card controller 1201 by using a PTP_ReceiveFile command. The card controller 1201 writes the buffered object in the directory path specified by the PTP_ReceiveFile command in the memory unit 1203.

Step S1114: The control unit 101 transmits a Read PTP Progress command to create ResponseCode, and acquires the reception (write) result of the object requested by the SendObject operation. The card controller 1201 sends back the reception (write) result. This send-back is also performed without using PTP.

Step S1016: The control unit 101 creates ResponseCode based on the reception (write) result of the object requested by the SendObject operation, and transmits it to the card controller 1201 by using a PTP_SendData command.

Step S1017: The card controller 1201 transmits the data (ResponseCode) transmitted by the PTP_SendData command to the PTP_Initiator module of the PC 200 via the PTP-IP module 123.

(Operation in DPS Mode)

Next, the operations of the DSC 100, memory card 120, and printer 300 serving as an example of an external device in the DPS mode will be explained. The DPS mode is a mode which implements direct print between the DSC 100 and the printer. Hence, PTP communication is performed between the PTP Responder module 110 of the DSC 100 and the PTP_Initiator module of the printer 300. The memory card 120 basically functions as a relay device, similar to the Path Through mode. In the DPS mode, the PTP Responder module 110 in the DSC 100 communicates with the PTP-IP module 123 via the Card I/O modules 130 and 131 to implement communication with the Initiator. That is, inter-module communication indicated by the arrows 141 in FIG. 6 is performed.

The following description assumes that the printer 300 functions as a PTP_Initiator. The PTP-IP module 123 performs communication with the printer 300.

The PictBridge Application module 112 serving as an application layer implements the direct print function using the DPS module 111 serving as a direct print protocol layer and each model on the lower layer of the DPS module 111. The lower layer of the DPS module 111 includes the PTP-Responder, PTP-IP, TCP/IP, and WirelessLAN modules.

A detailed operation will be explained for a standard case in which PictBridge compatible devices are connected to each other to perform first printing according to a standard sequence described in CIPA DC-001-2003.

The following processing is the same as conventional exchange performed when the DSC 100 and printer 300 are connected by the USB to execute direct print conforming to PictBridge, when viewed from the memory card 120 and printer 300. In the embodiment, the same exchange as the conventional one is implemented between the DSC 100 and the printer 300 via the memory card 120 set in the DPS mode, similar to the Path Through mode.

Figure 12A:
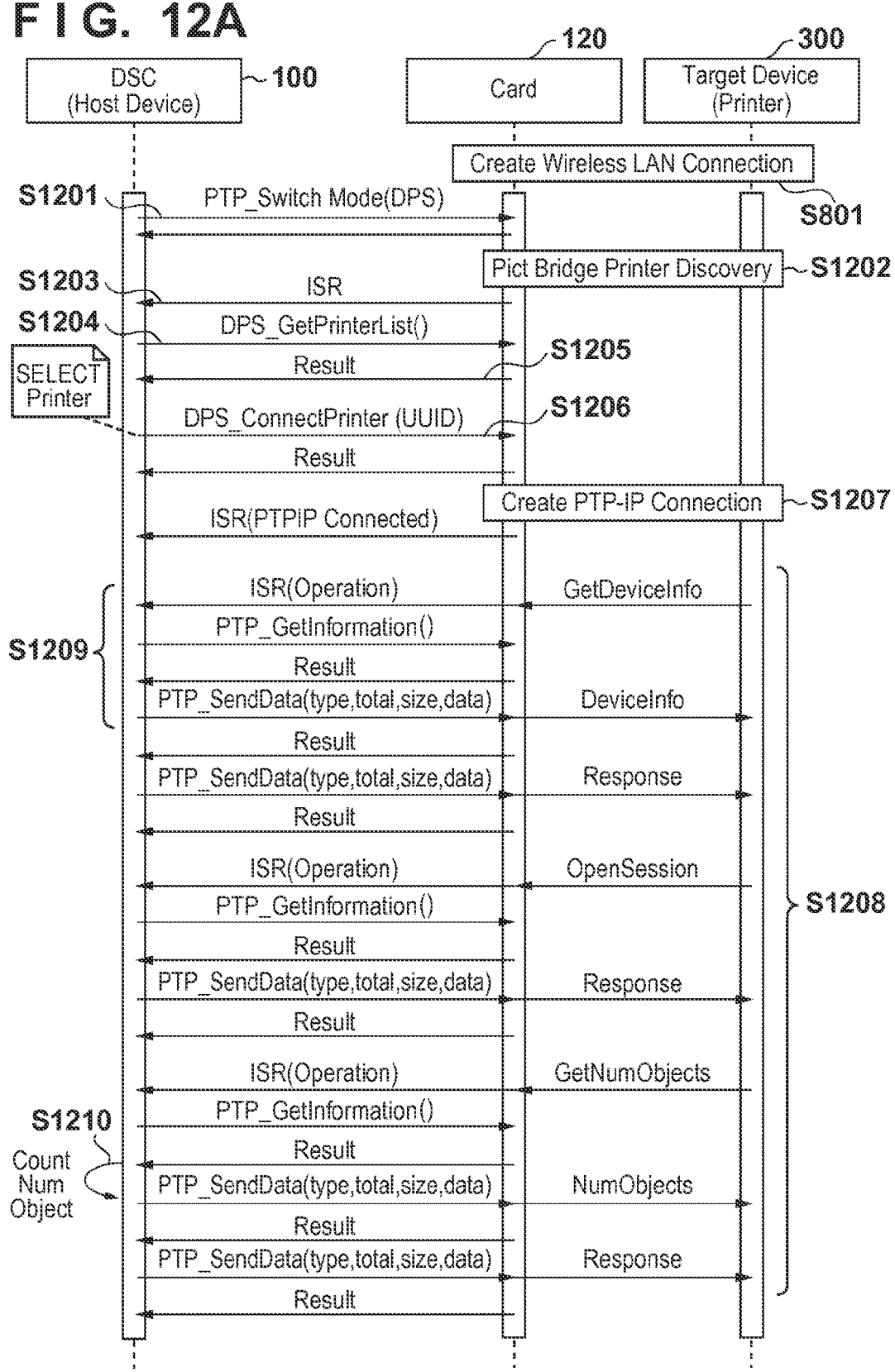
FIG. 12A is a sequence chart showing the operations (DPS Discovery) of the DSC 100, the memory card 120, and a printer 300 in the DPS mode according to the embodiment of the present invention.
Figure 12B:
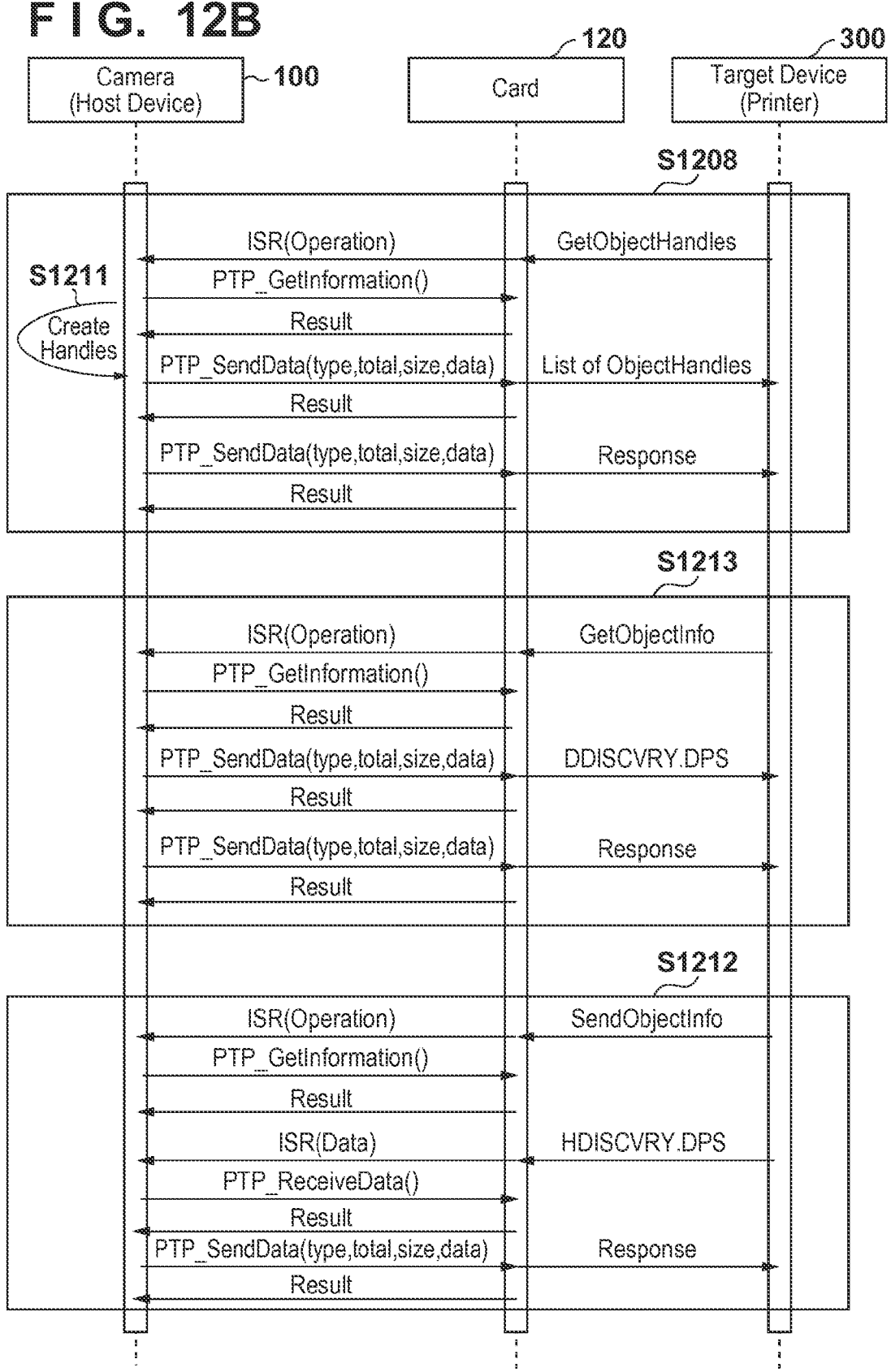
FIG. 12B is a sequence chart showing the operations (DPS Discovery) of the DSC 100, memory card 120, and printer 300 in the DPS mode according to the embodiment of the present invention.

First, a DPS Discovery operation will be described with reference to sequence charts shown in FIGS. 12A and 12B. Note that communication between the DSC 100 and the memory card 120 shown in FIG. 12A represents commands exchanged between the Card I/O modules 130 and 131, unless otherwise specified. Assume that, when the DSC 100 receives a command regarding a PTP operation from the memory card 120, the Card I/O module 130 transfers the received command as a PTP operation to the PTP Responder module 110. Also in this case, the memory card 120 searches for a connectable network and automatically connects to it in step S801. When the connection is established, an interrupt signal is transmitted to the DSC 100.

Step S1201: When the user designates connection to the printer via a GUI as shown in FIG. 7, the control unit 101 issues a PTP_SwitchMode (DPS) command using the PTP Application module 113, and sets the memory card 120 in the DPS mode. When the card controller 1201 recognizes the setting to the DPS mode, it inhibits access to the memory unit 1203 except for a case in which an instruction from the DSC 100 is received, similar to the Path Through mode.

Step S1202: In accordance with the instruction from the DSC 100, the card controller 1201 performs PictBridge Printer Discovery using the Discovery for DPS module 127. Discovery in the DPS mode is search for a printer, unlike discovery in the Pull mode and Path Through mode that is advertisement (disclosure of the presence). Therefore, a PTP_SetDeviceInformation command before setting to the DPS mode is not always necessary. In the embodiment, the card controller 1201 performs discovery by a UPnP protocol using the Discovery for DPS module 127. By the discovery, the identification information (UUID) and name of a DPS compatible printer present on the network are acquired, and a printer list is generated.

Note that discovery is executed, for example, periodically. If the search result has changed, the card controller 1201 can notify the DSC 100 of the change using the interrupt signal ISR.

Step S1203: If a DPS compatible printer has been discovered by PictBridge Printer Discovery, the card controller 1201 notifies the control unit 101 of the discovered printer using the interrupt signal ISR.

Step S1204: The control unit 101 issues a DPS GetPrintList command to request a printer list.

Step S1205: The card controller 1201 transmits the generated printer list to the control unit 101.

Step S1206: The control unit 101 creates, from the received printer list, a GUI screen for selecting a printer by the user, and displays it on the display unit 105. The GUI format is not particularly limited, and the GUI presents information which allows the user to specify a printer.

When the user selects a printer from the list via the operation unit 104 and presses the OK button, the control unit 101 recognizes the selected printer. The control unit 101 then transmits a DPS ConnectPrinter command which specifies identification information (UUID) of the selected printer.

Step S1207: The PTP-IP module 123 establishes a PTP-IP connection with a printer corresponding to the UUID specified by the DPS ConnectPrinter command. The card controller 1201 notifies the control unit 101 of the establishment of the connection by using an interrupt signal ISR (PTPIP Connected).

Step S1208: After the PTP-IP connection is established, the Initiator (printer 300) sequentially issues GetDeviceInfo, OpenSession, GetNumObjects, and GetObjectHandles operations.

Step S1209: As described in the explanation of the Path Through mode, the DSC 100 serving as a Responder is notified of the reception of the operation from the Initiator by an interrupt signal ISR(Operation). The DSC 100 issues a PTP_GetInformation command to acquire the PTP operation received by the memory card 120, and creates data to be transmitted in response to the acquired operation. The DSC 100 transmits the created data to the memory card 120 using a PTP_SendData command, and the PTP-IP module 123 transmits it to the printer 300. This sequence is sequentially executed for each operation mentioned above.

Even in the DPS mode, as well as the Path Through mode, the DSC 100 serving as a Responder manages an object recorded in the memory card 120. For this purpose, it is necessary to allocate ObjectHandle necessary to specify an object in PTP, and acquire and manage information about the number of objects and the like. In FIG. 12A, in response to the GetNumObjects operation from the printer 300 serving as an Initiator, objects in the memory card 120 are counted to generate NumObjects to be sent back (step S1210). Similarly, in response to the GetObjectHandles operation, ObjectHandle is allocated to each object in the memory card 120, and ObjectHandleArray serving as an array of ObjectHandles is created (FIG. 12B: step S1211).

As a matter of course, these kinds of information may be generated upon, for example, power-on, and updated when a change is detected.

Steps S1213 and S1212: According to the PictBridge standard, in DPS Discovery, the Responder notifies the presence of a predetermined file DDISCVRY.DPS, and the Initiator notifies the presence of a predetermined file HDISCVRY. DPS, thereby recognizing that their partners are PictBridge compatible devices. When it is recognized from the exchange of these script files that the printer 300 is a PictBridge compatible device, the PictBridge Application module performs subsequent control.

Next, a DPS_ConfigurePrintService operation will be explained with reference to a sequence chart shown in FIG. 13. In DPS_ConfigurePrintService, the DSC 100 requests the start of PrintService provided by the printer 300. Also, device information is exchanged.

The processing in FIG. 13 essentially includes
transmitting a script "DREQUEST.DPS" from the DSC 100 to the printer 300 (step S1301),
transmitting a DPS script "ConfigurePrintService" from the DSC 100 to the printer 300 (step S1302),
transmitting a script "HRESPONSE.DPS" from the printer 300 to the DSC 100 (step S1303), and
transmitting a DPS script "ConfigurePrintService result" from the printer 300 to the DSC 100 (step S1304).

"DREQUEST.DPS" notifies the printer 300 from the DSC 100 that transmission of a DPS script will start in step S1302. "HRESPONSE.DPS" notifies the DSC 100 from the printer 300 that transmission of a DPS script will start in step S1304.

The DPS script "ConfigurePrintService" is a script in the XML format representing apparatus information (for example, vendor name, product name, and serial number) of the DSC 100 and the like, as shown in FIG. 14A. Similarly, the DPS script "ConfigurePrintService result" is a script in the XML format representing information (for example, vendor name, product name, and serial number) about the printer 300.

Subsequently to the DPS_ConfigurePrintService sequence, DPS_GetCapability and DPS_StartJob sequences are performed. These sequences are the same as that in FIG. 13 except that DPS scripts transmitted in step S1302 are "GetCapability" and "StartJob", and DPS scripts transmitted in step S1304 are "GetCapability result" and "StartJob result", so a description thereof will not be repeated.

DPS_GetCapability is a sequence which inquires, of the printer 300 from the DSC 100, a capability settable in the printer 300. The PictBridge Application module 112 can generate a setting GUI corresponding to a response content from the printer 300, and prompt the user to set a capability. FIG. 14B exemplifies the DPS scripts "GetCapability" and "GetCapability result" exchanged in the DPS_GetCapability sequence.

StartJob is a sequence which requests the printer 300 from the DSC 100 to start printing together with various kinds of print setting information upon receiving, for example, a print start instruction from the user of the DSC 100 via the operation unit 104. FIG. 14C exemplifies the DPS scripts "StartJob" and "StartJob result" exchanged in the StartJob sequence.

Subsequent sequences are DPS_GetFileInfo and DPS_GetFile. In FIG. 15, step S1501 is the DPS_GetFileInfo sequence, and the printer 300 acquires information about data (to be printed by the DSC 100) to be acquired from now. The information to be acquired includes the size (pixel count) and file name of an image. By the DPS_GetFile sequence in step S1502, the printer 300 acquires, from the DSC 100, a file whose information has been acquired by the DPS_GetFileInfo sequence.

In FIG. 15, similar to step S1003 of FIG. 13, when transmitting requested data from the DSC 100, the data is temporarily loaded from the memory card 120 into the DSC 100 and then transmitted via the memory card 120. However, as shown in FIG. 11, a directory path may be specified from the DSC 100 to transmit data from the memory card 120 without loading the data from the memory card 120 into the DSC 100.

After the end of transferring data to be printed, the printer 300 executes print processing based on settings. The printer 300 can notify the DSC 100 of the apparatus status by a DPS_NotifyDeviceStatus sequence.

A DPS_NotifyDeviceStatus operation will be explained with reference to a sequence chart shown in FIG. 16. In DPS_NotifyDeviceStatus, the printer 300 transmits the status of the printer 300 to the DSC 100.

Figure 16:
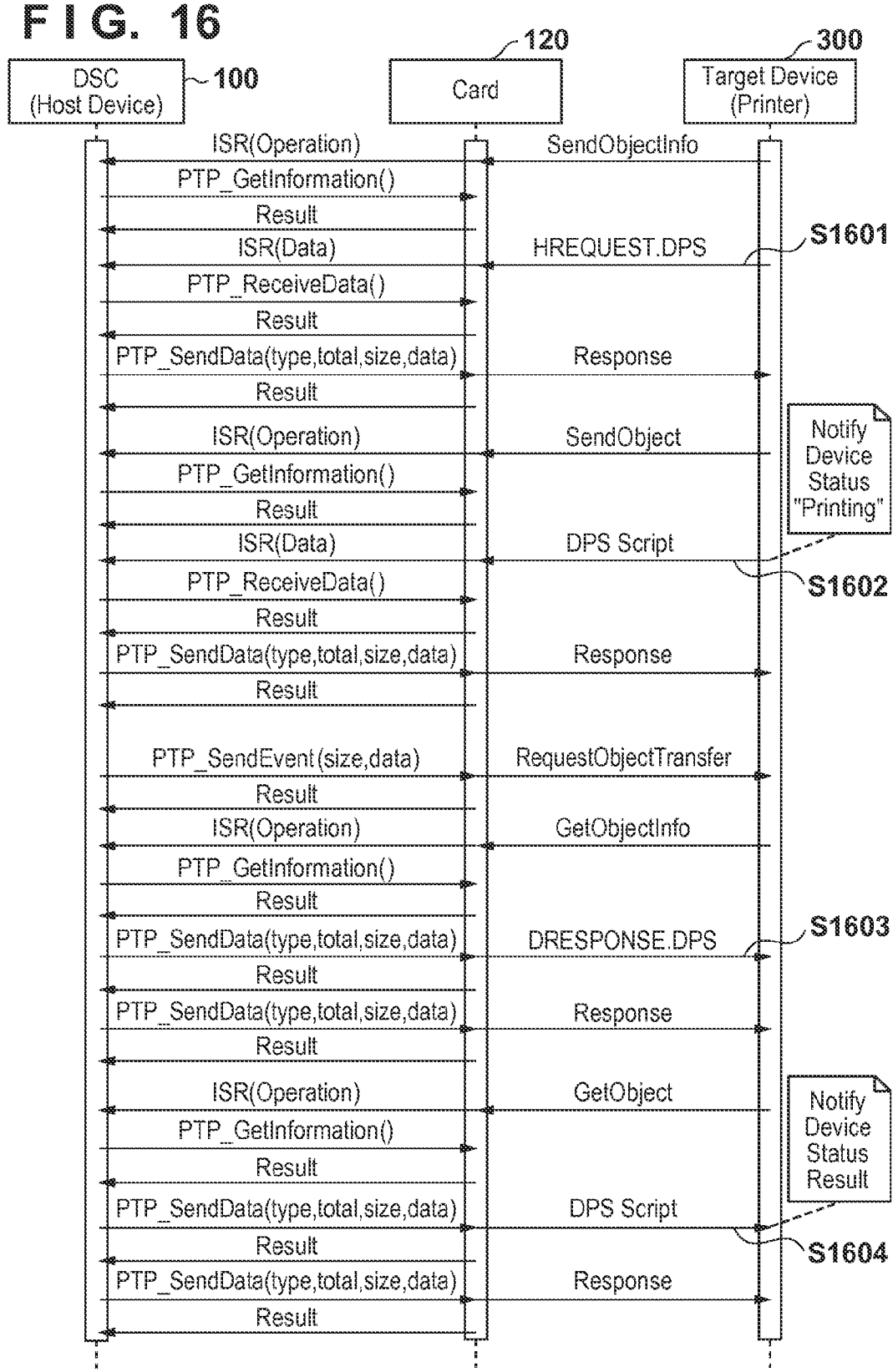
FIG. 16 is a sequence chart showing the operations (DPS_NotifyDeviceStatus) of the DSC 100, memory card 120, and printer 300 in the DPS mode according to the embodiment of the present invention.

The processing in FIG. 16 includes
transmitting a script "HREQUEST.DPS" from the printer 300 to the DSC 100 (step S1601),
transmitting a DPS script "NotifyDeviceStatus (Printing)" from the printer 300 to the DSC 100 (step S1602),
transmitting a script "DRESPONSE.DPS" from the DSC 100 to the printer 300 (step S1603), and
transmitting a DPS script "NotifyDeviceStatus result" from the DSC 100 to the printer 300 (step S1604).

"HREQUEST.DPS" notifies the DSC 100 from the printer 300 that transmission of a DPS script will start in step S1602. "DRESPONSE.DPS" notifies the printer 300 from the DSC 100 that transmission of a DPS script will start in step S1604.

The DPS script "NotifyDeviceStatus" is a script in the XML format representing the status of the printer 300 (for example, during printing, whether a new job can be accepted, whether an error has occurred, or the cause of an error), as shown in FIG. 17A. The DPS script "NotifyDeviceStatus result" is a script in the XML format that is sent back simply as a response from the DSC 100.

The same sequence NotifyJobStatus as that in FIG. 16 can be used when the printer 300 notifies the DSC 100 of the status of a job during printing. NotifyJobStatus is the same as that in FIG. 16 except that a DPS script transmitted in step S1602 is "NotifyJobStatus( )" (description indicating the status of a job is parenthesized), and a DPS script transmitted in step S1604 is "NotifyJobStatus result", so a description thereof will not be repeated.

FIG. 17B exemplifies scripts "NotifyJobStatus" and "NotifyJobStatus result" exchanged in the NotifyJobStatus sequence. In this example, "NotifyJobStatus" notifies that 4/6 page is being printed now. "NotifyJobStatus result" is a response script.

As described above, according to the embodiment, a memory card having the wireless communication function includes a PTP Responder, and the PTP Responder of the memory card and that of a host device (DSC) can be switched to perform PTP communication with an external device using the PTP-IP module. Therefore, the memory card can transfer data to the external device by PTP independently of the host device. Also, the host device can perform PTP communication with the external device by using the memory card as a wireless adapter. As a result, the memory card having the wireless communication function can be used in a wide variety of application purposes using an existing PTP compatible device.

Of the Pull mode, DPS mode, and Path Through mode, the versatility of the Pull mode is considered to be high. Thus, when the memory card 120 is connected to a network, the DSC 100 may automatically issue a PTP_SwitchMode (pull) command first. When the user is prompted to select which of DLNA and PTP is used, the DSC 100 may automatically issue a PTP_SwitchMode (pull) command in response to selection of the use of PTP.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265311, filed on Dec. 2, 2011, which is hereby incorporated by reference herein its entirety.

The invention claimed is:

1. A non-transitory recording medium removable from a host device, comprising:
   one or more CPUs configured to perform the functions of a wireless communication unit, an image transmission control unit, a determination unit, and a notification unit, wherein,
   the wireless communication unit is configured to establish wireless communication with an external device different from the host device by using a wireless communication protocol;
   the image transmission control unit is capable of transmitting image data to the external device via the wireless communication established by said wireless communication unit by using an image transmission protocol;
   the determination unit is configured to determine either said image transmission control unit of the recording medium or image transmission control unit of the host device, to which the recording medium is attached, is used to transmit image data via the wireless communication established by said wireless communication unit; and
   the notification unit is configured to, upon receiving a signal based on the image transmission protocol from the external device in a case where it is determined by the determination unit that the image transmission control unit of the host device is to be used to transmit image data to the external device, notify the host device of the reception of the signal using an interrupt signal.

2. The medium according to claim 1, wherein the determination by said determination unit is based on a mode set from the host device.

3. The medium according to claim 1, wherein in a case where it is determined by the determination unit that the image transmission control unit of the host device is to be used to transmit image data to the external device, if image data to be transmitted from the host device to the external device is specified, the specified image data is transmitted to the external device via said wireless communication unit.

4. The medium according to claim 1, wherein in a case where it is determined by the determination unit that the image transmission control unit of the host device is to be used to transmit image data to the external device, access to a memory of the recording medium is inhibited except for an instruction from the host device.

5. The medium according to claim 1, wherein in a case where it is determined by the determination unit that the image transmission control unit of the recording medium is to be used to transmit image data to the external device, access to a memory of the recording medium by the host device is inhibited.

6. The medium according to claim 1, wherein in a case where it is determined by the determination unit that the image transmission control unit of the recording medium is to be used to transmit image data to the external device, an operation to change a content of a memory of the recording medium by the host device is inhibited.

7. The medium according to claim 1, wherein the image transmission protocol includes PTP (Picture Transfer Protocol), and said wireless communication unit supports PTP-IP (Picture Transfer Protocol over Internet Protocol) and TCP/IP (Transmission Protocol/Internet Protocol).

8. The medium according to claim 7, wherein the host device functions as a responder of the PTP in a case where it is determined by the determination unit that the image transmission control unit of the host device is to be used to transmit image data to the external device, and the recording medium functions as a responder of the PTP when transmitting an image to the external device using said image transmission control unit of the recording medium.

9. A non-transitory recording medium removable from a host device, comprising:
   one or more CPUs configured to perform the functions of a wireless communication unit with an external device different from the host device;
   a Responder module which performs communication conforming to PTP (Picture Transfer Protocol) or MTP (Multimedia Transfer Protocol) with the external device via said wireless communication unit, and causes the recording medium to function as a Responder in the PTP or the MTP; and
   a controller which switches which of said Responder module of the recording medium and a Responder module of the host device, to which the recording medium is attached, that causes the host device to function as the Responder is used to perform PTP or MTP communication with the external device via said wireless communication unit.

10. A method of controlling a non-transitory recording medium removable from a host device different from an external device, the recording medium including:
   one or more CPUs configured to perform functions of a wireless communication unit, and an image transmission control unit, wherein,
   the wireless communication unit is capable of establishing wireless communication with an external device by using a wireless communication protocol; and
   the image transmission control unit is capable of transmitting image data to the external device via the wireless communication established by the wireless communication unit by using an image transmission protocol, the method comprising:
   a determination step of determining either the image transmission control unit of the recording medium or image transmission control unit of the host device, to which the recording medium is attached, is used to transmit image data via the wireless communication established by the wireless communication unit; and
   a notification step of, upon receiving a signal based on the image transmission protocol from the external device when the image transmission control unit of the host device is used to transmit image data to the external device, notifying the host device of the reception of the signal using an interrupt signal.

11. The method according to claim 10, wherein the determination by said determination step is based on a mode set from the host device.

12. The method according to claim 10, further comprising a transmission step of, in a case where it is determined in the determination step that the image transmission control unit of the host device is to be used to transmit image data to the external device, if image data to be transmitted from the host device to the external device is specified, transmitting the specified image data to the external device via the wireless communication unit.

13. The method according to claim 10, wherein in a case where it is determined in the determination step that the image transmission control unit of the host device is to be used to transmit image data to the external device, access to a memory of the recording medium is inhibited except for an instruction from the host device.

14. The method according to claim 10, wherein in a case where it is determined in the determination step that the image transmission control unit of the recording medium is to be used to transmit image data to the external device, access to a memory of the recording medium by the host device is inhibited.

15. The method according to claim 10, wherein in a case where it is determined in the determination step that the image transmission control unit of the recording medium is to be used to transmit image data to the external device, an operation to change a content of a memory of the recording medium by the host device is inhibited.

16. The method according to claim 10, wherein the image transmission protocol includes PTP (Picture Transfer Protocol), and the wireless communication unit supports PTP-IP (Picture Transfer Protocol over Internet Protocol) and TCP/IP (Transmission Protocol/Internet Protocol).

17. The method according to claim 16, wherein the host device functions as a responder of the PTP in a case where it is determined in the determination step that the image transmission control unit of the host device is to be used to transmit image data to the external device, and the recording medium functions as a responder of the PTP when transmitting an image to the external device using the image transmission control unit of the recording medium.

18. A method of controlling a recording medium which includes wireless communication unit configured to perform wireless communication with an external device, and is removable from a host device different from the external device, the recording medium further including a Responder module which performs communication conforming to PTP (Picture Transfer Protocol) or MTP (Multimedia Transfer Protocol) with the external device via the wireless communication unit, and causes the recording medium to function as a Responder in the PTP or the MTP, the method comprising the step of:
   switching which of the Responder module of the recording medium and a Responder module of the host device, to which the recording medium is attached, that causes the host device to function as the Responder is used to perform PTP or MTP communication with the external device via the wireless communication unit.

19. A non-transitory recording medium removable from a host device, comprising:
   a memory storing wireless communication protocol and image transmission protocol; and
   one or more CPUs configured to perform functions of a wireless communication unit, an image transmission control unit, a determination unit, wherein,
   the wireless communication unit is configured to establish wireless communication with an external device different from the host device by using the wireless communication protocol;
   the image transmission control unit is capable of transmitting image data to the external device via the wireless communication established by said wireless communication unit by using an image transmission protocol; and
   the determination unit is configured to determine either said image transmission protocol stored in the memory or an image transmission protocol stored in the host device, to which the recording medium is attached, is to be used to transmit image data via the wireless communication established by said wireless communication unit.

20. The medium according to claim 19, wherein the determination by said determination unit is based on a mode set from the host device.

21. The medium according to claim 19, wherein the one or more CPUs is further configured to perform the function of a notification unit, wherein the notification unit is configured to, upon receiving a signal based on the image transmission protocol from the external device in a case where it is determined by the determination unit that the image transmission protocol stored in the host device is to be used to transmit image data to the external device, notify the host device of the signal using an interrupt signal.

22. The medium according to claim 19, wherein in a case where it is determined by the determination unit that the image transmission protocol stored in the host device is to be used to transmit image data to the external device, if image data to be transmitted from the host device to the external device is specified, the specified image data is transmitted to the external device via said wireless communication unit.

23. The medium according to claim 19, wherein in a case where it is determined by the determination unit that the image transmission protocol stored in the host device is to be used to transmit image data to the external device, access to a memory of the recording medium is inhibited except for an instruction from the host device.

24. The medium according to claim 19, wherein in a case where it is determined by the determination unit that the image transmission protocol stored in the recording medium is to be used to transmit image data to the external device, access to a memory of the recording medium by the host device is inhibited.

25. The medium according to claim 19, wherein in a case where it is determined by the determination unit that the image transmission protocol stored in the recording medium is to be used to transmit image data to the external device, an operation to change a content of a memory of the recording medium by the host device is inhibited.

26. The medium according to claim 19, wherein the image transmission protocol includes PTP (Picture Transfer Protocol), and said wireless communication unit supports PTP-IP (Picture Transfer Protocol over Internet Protocol) and TCP/IP (Transmission Protocol/Internet Protocol).

27. A method of controlling a non-transitory recording medium which is removable from a host device, the recording medium including:
    a memory storing wireless communication protocol and image transmission protocol; and
    one or more CPUs configured to perform functions of a wireless communication unit, and an image transmission control unit, wherein,
    the wireless communication unit is configured to establish wireless communication with an external device different from the host device by using the wireless communication protocol; and
    the image transmission control unit capable of transmitting image data to the external device via the wireless communication established by said wireless communication unit by using an image transmission protocol, the method comprising:
    a determination step of determining either said image transmission protocol stored in the memory or an image transmission protocol stored in of the host device, to which the recording medium is attached, is to be used to transmit image data via the wireless communication established by said wireless communication unit.

* * * * *